(12) United States Patent
Hattori et al.

(10) Patent No.: US 8,958,552 B2
(45) Date of Patent: Feb. 17, 2015

(54) DATA PROCESSING DEVICE

(75) Inventors: Mitsuhiro Hattori, Tokyo (JP); Yoichi Shibata, Tokyo (JP); Takashi Ito, Tokyo (JP); Nori Matsuda, Tokyo (JP); Katsuyuki Takashima, Tokyo (JP); Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 13/504,506

(22) PCT Filed: Oct. 29, 2009

(86) PCT No.: PCT/JP2009/068584
§ 371 (c)(1),
(2), (4) Date: Apr. 27, 2012

(87) PCT Pub. No.: WO2011/052056
PCT Pub. Date: May 5, 2011

(65) Prior Publication Data
US 2012/0207299 A1    Aug. 16, 2012

(51) Int. Cl.
*H04K 1/00* (2006.01)
*H04L 9/00* (2006.01)
(Continued)

(52) U.S. Cl.
CPC ............... *H04L 9/3073* (2013.01); *H04L 9/008* (2013.01); *H04L 9/3231* (2013.01)
USPC .......................................................... 380/30

(58) Field of Classification Search
CPC ......... H04L 9/008; H04L 9/3073; H04L 9/30; H04L 9/32; H04L 9/3231
USPC .......................................................... 380/30
See application file for complete search history.

(56) References Cited

U.S. PATENT DOCUMENTS

2007/0016528 A1*  1/2007  Verhaegh et al. ............... 705/50

2009/0006855 A1*  1/2009  Tuyls et al. ..................... 713/182

FOREIGN PATENT DOCUMENTS

JP         2-25925        1/1990
JP         5-290149       11/1993
(Continued)

OTHER PUBLICATIONS

Hattori et al., "Secure Biometric Authentication Using 2-DNF Homomorphic Encryption", Nov. 2009, The Institute of Electronics Information and Communication Engineers, Technical Report of IEICE, pp. 1-8. (Submitted prior art of U.S. Appl. No. 13/982,546).*
(Continued)

*Primary Examiner* — Peter Poltorak
*Assistant Examiner* — Quy Pham
(74) *Attorney, Agent, or Firm* — Oblon, Spivak, McClelland, Maier & Neustadt, L.L.P.

(57) ABSTRACT

A certification device 101 encrypts a feature vector for registration by using a random number and a public key which is set to correspond to a secret key in a decryption device 103. The encrypted feature vector for registration is registered in an authentication device 102. In authentication, the certification device encrypts a feature vector for authentication by using the public key and a random number. With the two encrypted feature vectors being kept encrypted, the authentication device generates encrypted similarity degree information from which the decryption device can derive the similarity degree between the two feature vectors by a decryption process using the secret key. The decryption device 103 decrypts the encrypted similarity degree information to derive the similarity degree of the plaintext. The authentication device 102, if the similarity degree is equal to or larger than a threshold, determines that the user is the correct user. The similarity degree can be derived without using the feature vector of the plaintext. Thus, secure identity authentication with a lower possibility of plaintext theft can be realized.

15 Claims, 23 Drawing Sheets

(51) Int. Cl.
*H04L 9/30* (2006.01)
*H04L 9/32* (2006.01)

(56) References Cited

FOREIGN PATENT DOCUMENTS

| JP | 2002-132731 | 5/2002 |
|----|-------------|--------|
| JP | 2004-265027 | 9/2004 |
| JP | 2005-130384 | 5/2005 |
| JP | 2005-209018 | 8/2005 |
| JP | 2006-158851 | 6/2006 |
| JP | 2007-114494 | 5/2007 |
| JP | 2008-129743 | 6/2008 |
| JP | 2008-521025 | 6/2008 |
| WO | WO 2006/054208 A1 | 5/2006 |

OTHER PUBLICATIONS

Boneh et al., "Evaluating 2-DNF Formulas on Ciphertexts", Apr. 2006, Theory of Cryptography Conference, Lecture Notes in Computer Science, vol. 3378, pp. 1-16 (Applicant submitted prior art).*

Bringer et al., "An Authentication Protocol with Encrypted Biometric Data", Lecture Notes in Computer Science, vol. 5023, 2008, pp. 109-124 (Applicant submitted prior art).*

International Search Report issued Jan. 12, 2010 in PCT/JP2009/068584.

Vladimir Kolesnikov, et al., "How to Combine Homomorphic Encryption and Garbled Circuits", Speed 2009 (Electronic Proceedings), Sep. 10, 2009, pp. 100-121.

Mitsuhiro Hattori, et al., "Public-key Encryption with Fuzzy Keyword Search", 2009 Symposium on Cryptography and Information Security, Jan. 20-23, 2009, pp. 1-6.

Tatsuaki Okamoto, et al., "Homomorphic Encryption and Signatures from Vector Decomposition", Pairing 2008, Lecture Notes in Computer Science, vol. 5209, 2008, pp. 57-74.

Dan Boneh, et al., "Evaluating 2-DNF Formulas on Ciphertexts", Theory of Cryptography Conference, Lecture Notes in Computer Science, vol. 3378, Apr. 2, 2006, pp. 1-16.

Craig Gentry, "Fully Homomorphic Encryption Using Ideal Lattices", ACM Symposium on Theory of Computing, Jun. 2, 2009, pp. 169-178.

David Freeman, et al., "A Taxonomy of Pairing-Friendly Elliptic Curves", Journal of Cryptology, Jun. 2009, pp. 1-53.

Julien Bringer, et al., "An Authentication Protocol with Encrypted Biometric Data", Lecture Notes in Computer Science, vol. 5023, 2008, pp. 109-124.

* cited by examiner

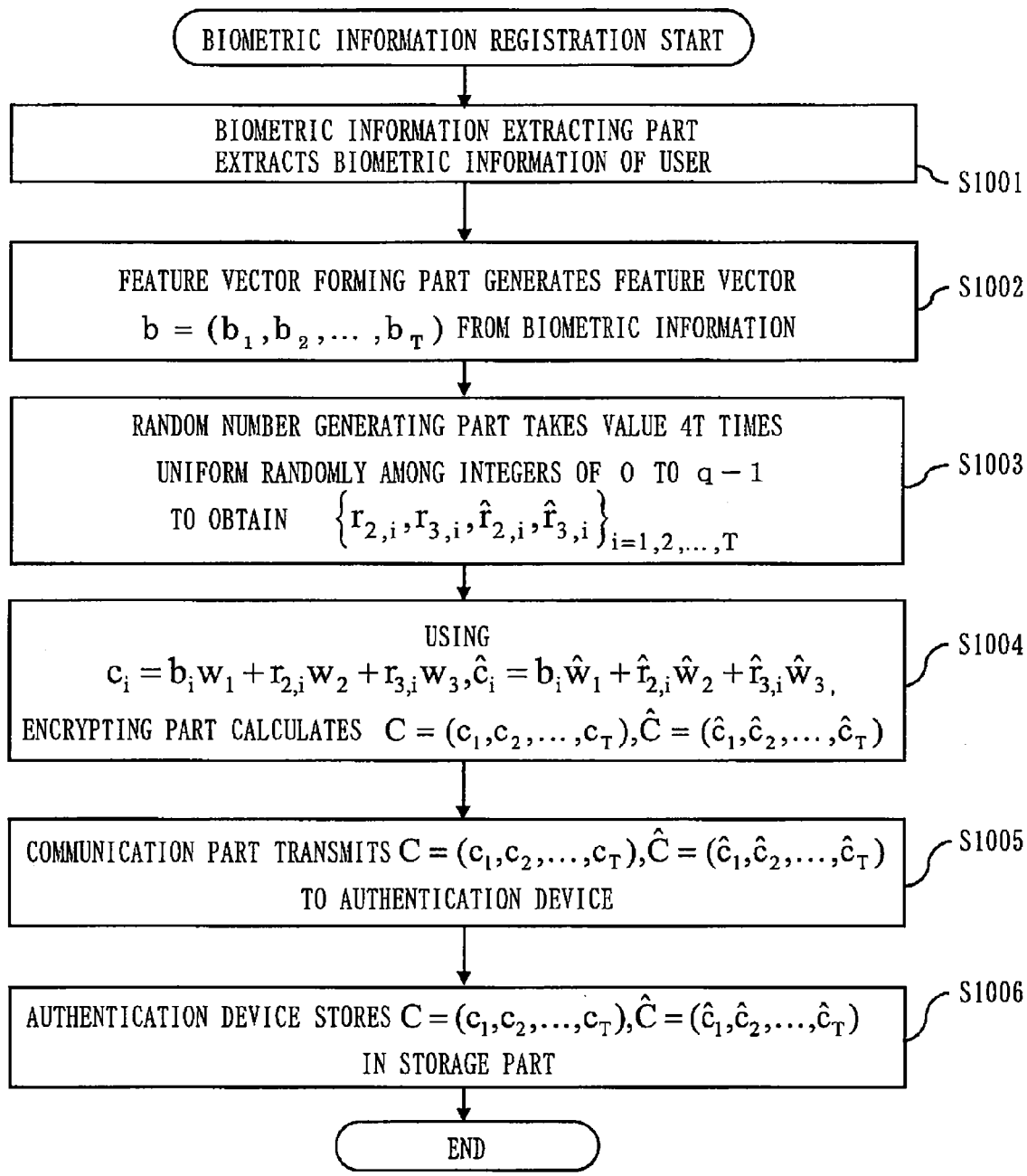

Fig. 11

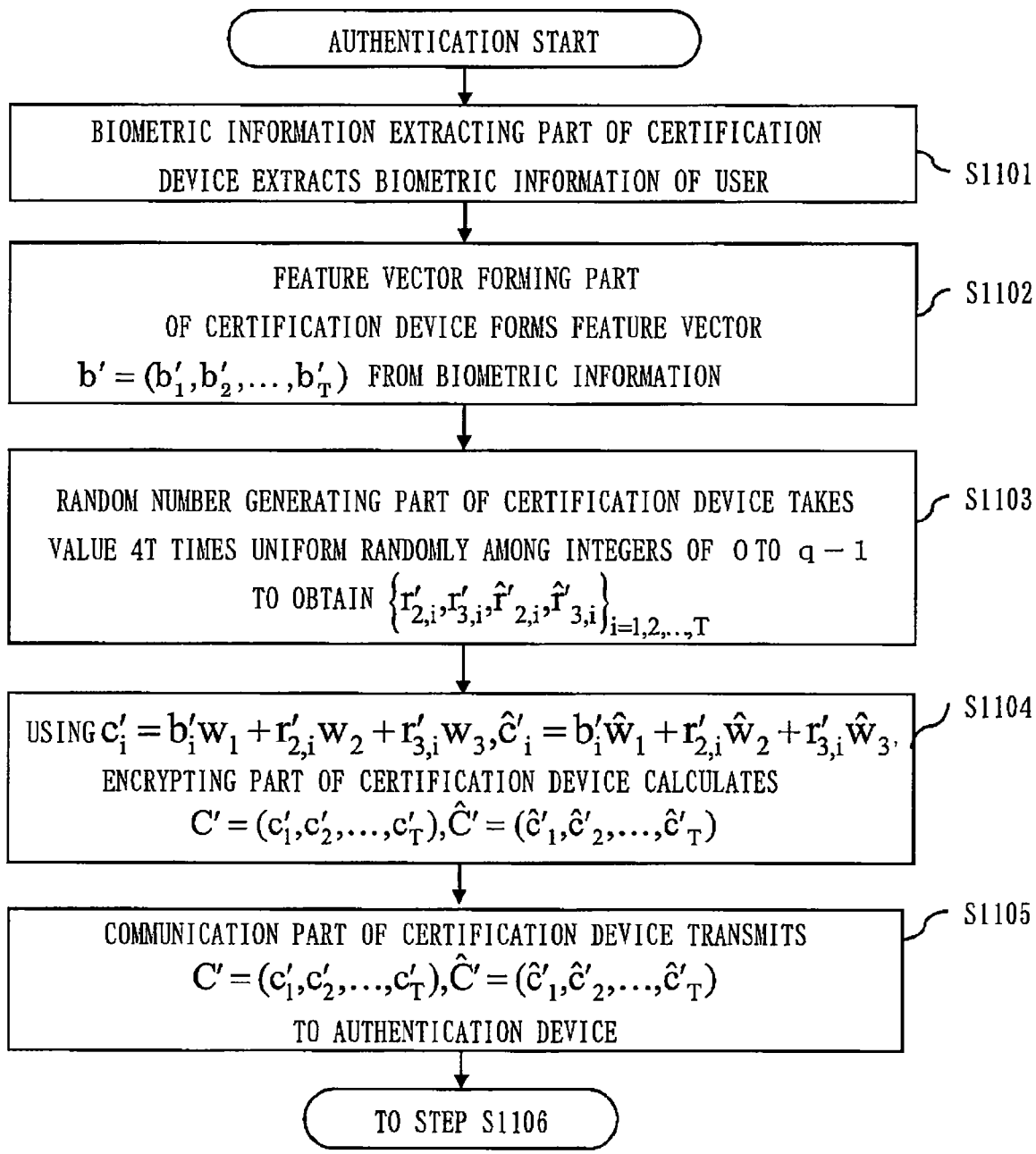

AUTHENTICATION START
↓
BIOMETRIC INFORMATION EXTRACTING PART OF CERTIFICATION DEVICE EXTRACTS BIOMETRIC INFORMATION OF USER — S1101
↓
FEATURE VECTOR FORMING PART OF CERTIFICATION DEVICE FORMS FEATURE VECTOR $b' = (b'_1, b'_2, \ldots, b'_T)$ FROM BIOMETRIC INFORMATION — S1102
↓
RANDOM NUMBER GENERATING PART OF CERTIFICATION DEVICE TAKES VALUE 4T TIMES UNIFORM RANDOMLY AMONG INTEGERS OF 0 TO $q-1$ TO OBTAIN $\{r'_{2,i}, r'_{3,i}, \hat{r}'_{2,i}, \hat{r}'_{3,i}\}_{i=1,2,\ldots,T}$ — S1103
↓
USING $c'_i = b'_i w_1 + r'_{2,i} w_2 + r'_{3,i} w_3, \hat{c}'_i = b'_i \hat{w}_1 + r'_{2,i} \hat{w}_2 + r'_{3,i} \hat{w}_3$, ENCRYPTING PART OF CERTIFICATION DEVICE CALCULATES $C' = (c'_1, c'_2, \ldots, c'_T), \hat{C}' = (\hat{c}'_1, \hat{c}'_2, \ldots, \hat{c}'_T)$ — S1104
↓
COMMUNICATION PART OF CERTIFICATION DEVICE TRANSMITS $C' = (c'_1, c'_2, \ldots, c'_T), \hat{C}' = (\hat{c}'_1, \hat{c}'_2, \ldots, \hat{c}'_T)$ TO AUTHENTICATION DEVICE — S1105
↓
TO STEP S1106

DATA PROCESSING DEVICE

TECHNICAL FIELD

The present invention relates to an authentication technique in which identity authentication is carried out, by using biometric information or the like.

BACKGROUND ART

Biometric authentication such as fingerprint authentication or vein authentication is a personal identification method which utilizes a difference in individual fingerprint pattern or individual vein shape.

In recent years, biometric authentication is employed in access management such as entry/exit management of a building, log-in management of a personal computer, and identity authentication at a bank ATM (Automated Teller Machine).

In biometric authentication, authentication is generally performed between a user (a person to be authenticated or certified) and an authentication device (authenticator) in the following manner.

In the registration step, the user registers his or her biometric information with the authentication device in advance.

In authentication, the user presents his/her biometric information to the authentication device.

The authentication device collates the presented biometric information with the registered biometric information. If the similarity degree between the two pieces of information satisfies a certain condition, the authentication device determines that the user is the correct user. If not, the authentication device determines that the user is a different person.

In this biometric authentication, it is desired that the biometric information be protected since it is privacy information that is characteristic of an individual.

Hence, a method of performing biometric authentication without revealing the biometric information itself has been proposed (for example, Patent Literature 1). According to this method, in registration, encrypted biometric information is registered, and in authentication, encrypted biometric information is collated.

As an encryption algorithm that can be used for encryption of biometric information, for example, encryption algorithms disclosed in Non-Patent Literatures 1 to 4 are available.

CITATION LIST

Patent Literature

Patent Literature 1: JP 2008-521025

Non-Patent Literature

Non-Patent Literature 1: T. Okamoto, K. Takashima, "Homomorphic encryption and signatures from vector decomposition", Pairing 2008, Lecture Notes in Computer Science, Vol. 5209, pp. 57-74, 2008.

Non-Patent Literature 2: D. Boneh, E. -J. Goh, K. Nissim, "Evaluating 2-DNF formulas on ciphertexts", Theory Of Cryptography Conference, Lecture Notes in Computer Science, Vol. 3378, pp. 325-341, 2005.

Non-Patent Literature 3: C. Gentry, "Fully homomorphic encryption using ideal lattices", ACM Symposium on Theory Of Computing, pp. 169-178, 2009.

Non-Patent Literature 4: D. Freeman, M. Scott, E. Teske, "A taxonomy of pairing-friendly elliptic curves", Journal Of Cryptology, June 2009.

SUMMARY OF INVENTION

Technical Problem

In Patent Literature 1, biometric information is protected by encryption utilizing a public key encryption technique. When encrypting the biometric information, an ordinary homomorphic encryption such as a Paillier encryption or ElGamal encryption is used as the encryption algorithm.

An ordinary homomorphic encryption is an encryption with which a ciphertext of the sum of original plaintexts can be calculated from a plurality of ciphertexts. For example, using T pieces of ciphertexts $E(x_1), E(x_2), \ldots, E(x_T)$, a ciphertext $E(x_1+x_2+\ldots+x_T)$ may be calculated.

Note that $E(x_1)$ represents the ciphertext of $x_1$ generated using a certain public key.

In the above case, addition is taken as an example. To define precisely, the ordinary homomorphic encryption mentioned above is an encryption with which a ciphertext formed by subjecting an original plaintext to a certain type of arithmetic operation can be calculated from a plurality of ciphertexts.

The type of arithmetic operation includes addition, multiplication, and the like on a finite field. In any case, one encryption is capable of only one type of arithmetic operation.

With the ordinary homomorphic encryption as mentioned above, however, in the calculation process of authentication, the entire process cannot be completed with encrypted biometric information alone. The process includes a portion that needs plaintext biometric information.

For example, with the authentication method described in Patent Literature 1, the hamming distance of the feature vectors generated from biometric information (that is, the hamming distance between bit strings that constitute the vectors) is employed as the index of similarity degree checking, and secrecy collation process is performed in the following procedure.

Note that the user does not access the authentication device directly, but accesses the certification device. The certification device communicates with the authentication device, and performs the registration process and authentication process of the biometric information.

Namely, a more general biometric authentication scheme including remote log-in which uses biometric information is supposed.

Also note that encryption is performed by using a public key that is common to the entire system.

In registration, the certification device extracts biometric information from the user, and constitutes a feature vector representing the user characteristics, from the extracted biometric information.

Assume that the feature vector is a bit string $X=(x_1, x_2, \ldots, x_T)$.

Using a Paillier encryption, the certification device encrypts each bit of the extracted feature vector, calculates an encrypted bit string $E(X)=(E(x_1), E(x_2), \ldots, E(x_T))$, sends the encrypted bit string calculated to the authentication device, and registers the encrypted bit string calculated, in the authentication device.

In authentication, the certification device extracts a biometric information bit string $Y=(y_1, y_2, \ldots, y_T)$ from the user in the same manner as in registration.

Then, the certification device receives the encrypted bit string $E(X)=(E(x_1), E(x_2), \ldots, E(x_T))$ registered, from the authentication device.

When calculating the ciphertext indicating the hamming distance $d_H(X, Y)$ between the bit strings X and Y, the certification device employs the following property (Numeric Expression 1) of the homomorphic encryption.

[Numerical Expression 1]

$$E(d_H(X, Y)) = \prod_{i=1}^{T} E(x_i^2 - 2x_iy_i + y_i^2) = \sum_{i=1}^{T} E(x_i - 2x_iy_i + y_i) = \sum_{i=1}^{T} E(x_i)E(y_i)E(x_i)^{-2yi}$$

The second expression is converted into the third expression, because each of $x_1$ and $y_1$ takes no other value but 0 or 1.

The third expression is converted into the fourth expression, because the Paillier encryption is an ordinary homomorphic encryption having a property with which a ciphertext of the sum of the original plaintexts can be obtained from the product of the ciphertexts.

Utilizing this property and employing the encrypted bit string $E(X)=(E(x_1), E(x_2), \ldots, E(x_T))$ received from the authentication device and the biometric information bit string $Y=(y_1, y_2, \ldots, y_T)$, the certification device calculates the following value (Numerical Expression 2), and sends the obtained value to the authentication device.

[Numerical Expression 2]

$$\prod_{i=1}^{T} E(y_i)E(x_i)^{-2yi}$$

The authentication device multiplies the received value by the following value (Numerical Expression 3), thus calculating an encryption hamming distance $E(d_H(X, Y))$.

Using a secure protocol, the hamming distance is decrypted, and similarity degree checking is performed.

[Numerical Expression 3]

$$\prod_{i=1}^{T} E(x_i)$$

As described above, with an ordinary homomorphic encryption such as a Paillier encryption, when calculating a ciphertext $-2x_iy_i$, a calculation $E(x_i)^{-2yi}$ is performed. Thus, a plaintext $y_i$ is needed in the exponential part.

In other words, the entire process cannot be performed with only the ciphertext because of the property of the homomorphic encryption.

For this reason, the authentication device must send the encrypted biometric information $E(x)=(E(x_1), E(x_2), \ldots, E(x_T))$ to the certification device once, and the certification device must perform calculation using the plaintext $y_i$.

In sending of the encrypted biometric information, in the case of so-called 1:1 authentication where the authentication-target user is separately specified by ID information or the like, it suffices if encrypted biometric information for one person is sent. In the case of so-called 1:N authentication where the authentication-target user is not specified and collation with many users stored in the database is required, it is necessary to send encrypted biometric information in number of pieces proportional to the number of users.

Consequently, there is a problem in that the communication amount between the authentication device and the certification device increases in proportion to the number of users.

It is also desired from the viewpoint of security that the plaintext biometric information be deleted from the certification device as soon as possible.

As described above, however, since the plaintext biometric information is required for authentication, in 1:N authentication particularly, the biometric information on a terminal cannot be deleted until authentication is completed, so there is a problem in that the biometric information will be exposed to the risk of theft for a longer period of time.

It is one of the major objects of the present invention to solve the above problems. The major object of the present invention is to render unnecessary a plaintext that has been required in the course of authentication process, and to diminish the risk of plaintext theft, thus providing a more secure secrecy collating method.

It is another object of the present invention is to decrease the communication amount between the authentication device and the certification device.

Solution to Problem

A data processing device according to the present invention includes:

a public key storage part which stores a public key generated in a decryption device based on a doubly homomorphic encryption algorithm and distributed by the decryption device;

an encrypted data storage part which stores, as encrypted first data, first data that has been encrypted by an encryption device which holds the public key distributed by the decryption device, by using the public key held in the encryption device;

an encrypted data input part which, after the encrypted first data is stored in the encrypted data storage part, inputs, as encrypted second data, second data that has been encrypted by the encryption device by using the public key held in the encryption device;

a random number generating part which generates a random number by using at least a part of the public key; and an encrypted similarity degree generating part which performs computation on the encrypted first data and the encrypted second data by using the public key stored in the public key storage part and the random number generated by the random number generating part, and generates, as encrypted similarity degree information, encrypted information from which a similarity degree between the first data and the second data can be derived by a decryption process using a secret key generated to correspond to the public key, with the encrypted first data and the encrypted second data being kept encrypted.

Advantageous Effects of Invention

According to the present invention, with both the encrypted first data and the encrypted second data being kept in the encrypted state, the encrypted similarity degree information from which the similarity degree between the first data and the second data can be derived by a decryption process using the secret key generated to correspond to the public key, is generated. The similarity degree between the first data and the second data can be derived without using the first data and the second data which are plaintexts. Thus, secure identity authentication with a lower possibility of plaintext theft can be realized.

BRIEF DESCRIPTION OF DRAWINGS

[FIG. 10] is a flowchart showing an example of a biometric information registration process according to Embodiment 2.

[FIG. 11] is a flowchart showing an example of an authentication process according to Embodiment 2.

DESCRIPTION OF EMBODIMENTS

Figure 1:
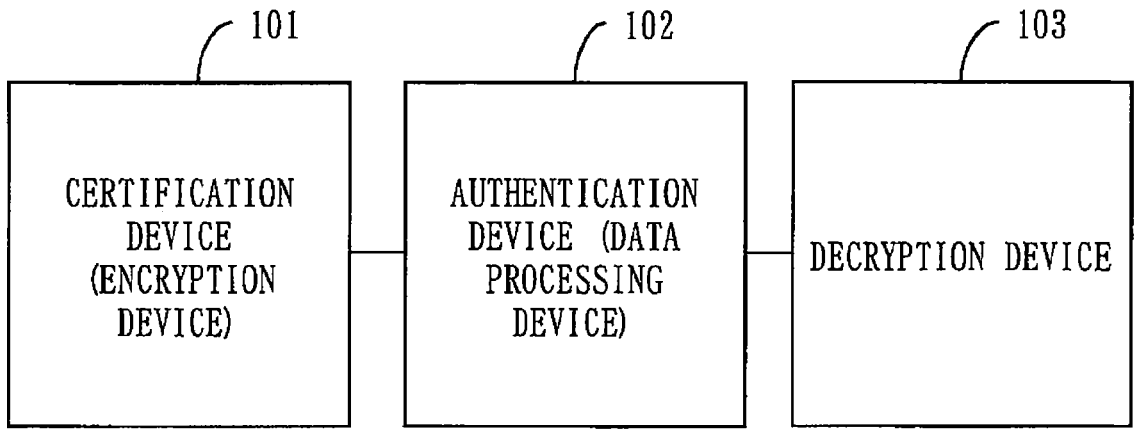
[FIG. 1] is a diagram showing a configuration of a biometric authentication system according to Embodiment 1.

In the following embodiments, an encryption called Doubly Homomorphic Encryption is employed as the cryptographic system aimed at protecting biometric information, instead of an ordinary homomorphic encryption.

With the double homomorphic encryption, unlike with the ordinary homomorphic encryption, a ciphertext of a combination of sums and products on the finite field of original plaintexts can be calculated from a plurality of ciphertexts. For example, a ciphertext $E(x_1 * y_1 + x_2 * y_2 + \ldots x_T * y_T)$ may be calculated by using, for example, 2T pieces of ciphertexts $E(x_1), E(x_2), \ldots, E(x_T), E(y_1), E(y_2), \ldots,$ and $E(y_T)$.

Namely, in the following embodiments, biometric information for registration is formed of T (T is an integer equal to or larger than 2) pieces of partial data, and biometric information for authentication is formed of T (T is an integer equal to or larger than 2) pieces of partial data.

The number of pieces of partial data which have coincident values among T pieces of partial data registered and T pieces of partial data input for authentication, the hamming distance between the T pieces of partial data registered and T pieces of partial data input for authentication, or the like is derived as a similarity degree. If the similarity degree is equal to or higher than a predetermined level, the identity of the user is authenticated.

Examples of the specific algorithm of the doubly homomorphic encryption include algorithms disclosed in Non-Patent Literatures 1 to 3.

To utilize such double homomorphic encryptions in biometric authentication, a method of generating a feature vector from biometric information must be modified, and a method of applying a doubly homomorphic encryption to a feature vector must be modified.

In biometric authentication, various types of indices are available for identity checking. Accordingly, various types of methods are available for generating a feature vector.

In order to render the feature vector of a plaintext unnecessary in the authentication process by effectively using the characteristics of the doubly homomorphic encryption, the index for identity checking needs to be modified.

The following embodiments disclose: a method for performing identity checking, using bit strings of 1 and 0 expressing presence and absence of a feature point, based on the number of positions both having bit value of 1; a method for performing identity checking based on the hamming distance between two bit strings; and a method for performing identity checking based on the Euclidean squared distance between numerical value strings.

Also, the encryption application method of each Literature needs to be modified in accordance with the identity checking method.

In the present invention, Embodiment 1 and Embodiment 2 disclose the application method of Non-Patent Literature 1. Embodiment 3 and Embodiment 4 disclose the application method of Non-Patent Literature 2.

The Okamoto-Takashima encryption algorithm of Non-Patent Literature 1 will be explained hereinafter by focusing on a scope necessary for explaining Embodiment 1 and Embodiment 2.

The Okamoto-Takashima encryption is an encryption that uses bilinear pairing vector spaces defined using an elliptic curve.

A plurality of methods may be available for constituting the bilinear pairing vector spaces. An explanation will be made hereinafter based on a method that constitutes bilinear pairing vector spaces by using a direct product of an elliptic curve.

Generally, an arithmetic operation on a group on an elliptic curve is often described as an arithmetic operation on an additive group. In the following explanation, however, all arithmetic operations including one on a finite field will be described as an arithmetic operation on a multiplicative group.

The arithmetic operation will be described according to a more general scheme that employs asymmetric pairing.

Assume that $G$, $G\char`^$, and $G_T$ are groups each having a prime order q.

Assume that $F_q = \{0, 1, \ldots, q-1\}$.

Assume that $e: G \times \hat{G} \to G_T$ is a pairing that satisfies bilinearity (a property with which $e(u^a, \hat{v}^b) = e(u, \hat{v})^{ab}$ is established for arbitrary $u \in G$, $\hat{v} \in \hat{G}$, $a, b \in F_q$) and non-degenerateness (a property with which $g \in G$ and $\hat{g} \in \hat{G}$ that satisfy $e(g, \hat{g}) \neq *1$ exist).

Assume that the direct product set of N pieces of groups G is $V = G \times G \times \ldots \times G$ and that the direct product set of N pieces of groups $\hat{G}$ is $\hat{V} = \hat{G} \times \hat{G} \times \ldots \times \hat{G}$.

At this time, the relation indicated by Numerical Expression 4 is established.

For $$x = (g^{x1}, g^{x2}, \ldots, g^{xN}) \in V, y = (g^{y1}, g^{y2}, \ldots, g^{yN})$$
$$\in V, \alpha \in F_q \qquad \text{[Numerical Expression 4]}$$

let us define $$x + y = (g^{x1+y1}, g^{x2+y2}, \ldots, g^{xN+yN})$$

and $$\alpha x = (g^{\alpha x1}, g^{\alpha x2}, \ldots, g^{\alpha xN})$$

then, V constitutes a vector space.

Likewise, for $$\hat{x} = (\hat{g}^{x1}, \hat{g}^{x2}, \ldots, \hat{g}^{xN}) \in \hat{V}, \hat{y} = (\hat{g}^{y1}, \hat{g}^{y2}, \ldots, \hat{g}^{yN}) \in \hat{V}, \alpha \in F_q$$

let us define $$\hat{x} + \hat{y} = (\hat{g}^{x1+y1}, \hat{g}^{x2+y2}, \ldots, \hat{g}^{xN+yN})$$

and $$\alpha \hat{x} = (\hat{g}^{\alpha x1}, \hat{g}^{\alpha x2}, \ldots, \hat{g}^{\alpha xN})$$

then, $\hat{V}$ constitutes a vector space.

Note that in this specification, a symbol formed of a character with "^" attached above it, such as $\hat{G}$, $\hat{g}$, $\hat{v}$ is the same as a symbol formed of a character with "^" attached on its side, such as $G^\wedge$, $g^\wedge$, or $v^\wedge$. This applies to $A^\wedge$, $C^\wedge$, $a^\wedge$, $c^\wedge$, $d^\wedge$, or $w^\wedge$ to be described later.

As the pairing of two vector spaces V and $\hat{V}$, let us define a pairing for $u = (u_1, u_2, \ldots, u_N) \in V$ and $\hat{v} = (\hat{v}_1, \hat{v}_2, \ldots, \hat{v}_N) \in \hat{V}$ as indicated by Numerical Expression 5.

$$e(u, \hat{v}) = \prod_{i=1}^{N} e(u_i, \hat{v}_i) \qquad \text{[Numerical Expression 5]}$$

In the vector spaces V and $\hat{V}$, a relation indicated by Numerical Expression 6 is established.

Assume that $$a_1 = (g, 1, 1, \ldots, 1), a_2 = (1, g, 1, \ldots, 1), \ldots, a_N = (1, 1, 1, \ldots, g)$$

and $$\hat{a}_1 = (\hat{g}, 1, 1, \ldots, 1), \hat{a}_2 = (1, \hat{g}, 1), \ldots, \hat{a}_N = (1, 1, 1, \ldots, \hat{g})$$

then, $$A = (a_1, a_2, \ldots, a_N), \hat{A} = (\hat{a}_1, \hat{a}_2, \ldots, \hat{a}_N) \qquad \text{[Numerical Expression 6]}$$

are respectively the bases of the vector spaces V and $\hat{V}$. Also, A and $\hat{A}$ satisfy $e(a_i, \hat{a}_j) = e(g, \hat{g})^{\delta_{i,j}}$ where $\delta_{i,j}$ is a Kronecker's delta. These bases A and $\hat{A}$ will be called canonical bases.

Assume that $x = x_1 a_1 + x_2 a_2 + \ldots + x_N a_N \in V$.

Let us define a distortion map $\phi_{i,j}: V \to V$ in the vector space V as $\phi_{i,j}(x) = x_j a_i$.

Likewise, for $\hat{x} = x_1 \hat{a}_1 + x_2 \hat{a}_2 + \ldots + x_N \hat{a}_N \in \hat{V}$, let us define $\hat{\phi}_{i,j}: \hat{V} \to \hat{V}$ as $\hat{\phi}_{i,j}(\hat{x}) = x_j \hat{a}_i$ These distortion maps can be calculated easily.

Two vector spaces which have canonical bases and for which a pairing of the spaces is defined and a distortion map that can be calculated is defined, as described above, are called bilinear pairing vector spaces.

Assume that $X = (X_{i,j})$ and $\hat{X} = (\hat{X}_{i,j})$ are each an N-row, N-column square matrix whose elements are formed of values selected from $F_q$ uniform randomly.

X and $\hat{X}$ which are constructed in this manner will each become a regular matrix at a very high probability.

When definition is made as indicated by Numerical Expression 7 by using such regular matrices, then $W = (w_1, w_2, \ldots, w_N)$ and $\hat{W} = (\hat{w}_1, \hat{w}_2, \ldots, \hat{w}_N)$ also become bases. These bases will be called random bases.

$$w_i = \sum_{j=1}^{N} X_{i,j} a_j, \quad \hat{w}_i = \sum_{j=1}^{N} \hat{X}_{i,j} \hat{a}_j \qquad \text{[Numerical Expression 7]}$$

According to Non-Patent Literature 1, concerning random bases $W = (w_1, w_2, \ldots, w_N)$ and $\hat{W} = (\hat{w}_1, \hat{w}_2, \ldots, \hat{w}_N)$ in the vector spaces V and $\hat{V}$, the following property is established.

When elements $(x_1, x_2, \ldots, x_N)$ of $F_q^N$ are given, it is easy to obtain $x = x_1 w_1 + x_2 w_2 + \ldots + x_N w_N$ and $\hat{x} = x_1 \hat{w}_1 + x_2 \hat{w}_2 + \ldots + x_N \hat{w}_N$.

However, it is known that when $x = x_1 w_1 + x_2 w_2 + \ldots + x_L w_L$ and $\hat{x} = x_1 \hat{w}_1 + x_2 \hat{w}_2 + \ldots + x_L \hat{w}_L$ ($1 < L \leq N$) are given, it is as difficult to obtain vectors $y = x_1 w_1 + x_2 w_2 + \ldots + x_1 w_1$ and $\hat{y} = x_1 \hat{w}_1 + x_2 \hat{w}_2 + \ldots + x_1 \hat{w}_1$ ($1 \leq l < N$) without using $X = (X_{i,j})$ and $\hat{X} = (\hat{X}_{i,j})$, as to perform a generalized Diffie-Hellman calculation.

Meanwhile, if $X = (X_{i,j})$ and $\hat{X} = (\hat{X}_{i,j})$ are employed, vector decomposition as described above can be calculated easily in accordance with the following algorithm Deco (Numerical Expression 8). Note that k in Numerical Expression 8 is an integer.

$$\text{Deco}(x, \langle w_1, \ldots, w_l \rangle, X): \qquad \text{[Numerical Expression 8]}$$

$$(t_{i,j}) \leftarrow X^{-1}$$

$$y \leftarrow \sum_{i=1}^{L} \sum_{j=1}^{l} \sum_{k=1}^{L} t_{i,j} x_{j,k} \phi_{k,i}(x)$$

$$\text{Deco}(\hat{x}, \langle \hat{w}_1, \ldots, \hat{w}_l \rangle, \hat{X}):$$

$$(\hat{t}_{i,j}) \leftarrow \hat{X}^{-1}$$

$$\hat{y} \leftarrow \sum_{i=1}^{L} \sum_{j=1}^{l} \sum_{k=1}^{L} \hat{t}_{i,j} \hat{x}_{j,k} \hat{\phi}_{k,i}(\hat{x})$$

From this property, a trapdoor function can be realized by employing a regular matrix as a secret key.

An example of a method of performing biometric authentication by using bilinear pairing vector spaces, with biometric information being kept encrypted, will be described hereinafter.

Embodiment 1

This embodiment will be exemplified by the following authentication scheme. An array of feature points is prepared as a feature vector to be used for biometric authentication. If the user has a feature point, 1 is stored in the array; if not, 0 is stored in the array. The resultant array is treated as the feature vector. In authentication, the number of positions where bits 1 coincide is employed as the similarity degree index.

To describe in more detail, for example, in the case of fingerprint authentication, a fingerprint image is divided into small areas, and the running directions of ridges within the areas are examined. The running directions in each area characterize each individual.

Let us assume the following authentication scheme. Four running directions (for example, 0°, 45°, 90°, and 135°) are defined for each area. The detected running direction is treated as 1, and the other directions are treated as 0. Four arrays are prepared for each of all N pieces of areas. The array values are determined according to the detected values, thus forming a feature vector.

With this authentication scheme, the positions of 1 are almost the same in the feature vectors of one person. Thus, the inner product value of the registered feature vector and the feature vector of an authentication target is expected to be large.

In the feature vector of a different person, the positions of 1 are often different from those of the person registered. Thus, the inner product value of the two feature vectors is expected to be small.

FIG. 1 is a diagram showing a configuration of a biometric authentication system according to Embodiments 1 to 4.

Referring to FIG. 1, a certification device 101 is a device that measures biometric information of a user and performs a secrecy collation process by using the measured biometric information.

An authentication device 102 is a device that encrypts the biometric information of the user, stores the encrypted biometric information, and performs authentication by using the encrypted biometric information stored.

A decryption device 103 is a device that decrypts encrypted data.

The certification device 101 is an example of an encryption device, and the authentication device is an example of a data processing device.

Figure 2:
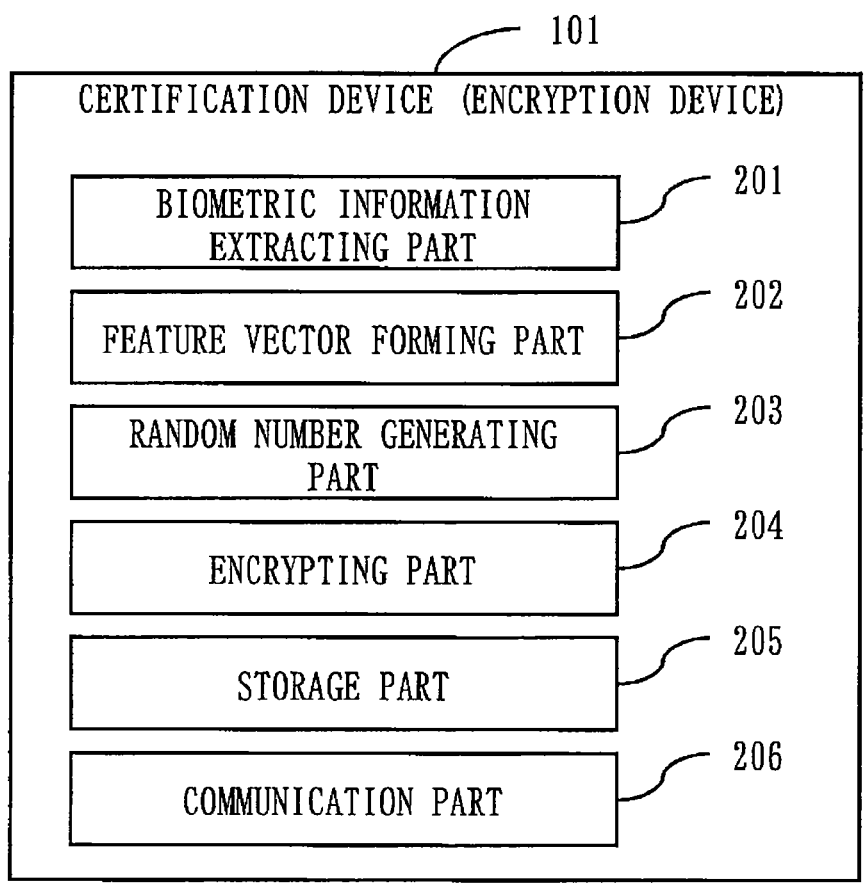
[FIG. 2] is a diagram showing a configuration of a certification device according to Embodiment 1.

FIG. 2 is a diagram showing an example of the internal configuration of the certification device 101.

Referring to FIG. 2, by using various types of sensors such as an optical camera or infrared camera, a biometric information extracting part 201 extracts biometric information necessary for personal identification, from the user.

A feature vector forming part 202 forms a feature vector representing the feature of the individual from the biometric information extracted by the biometric information extracting part 201.

A random number generating part 203 generates a random number by using a part of a public key.

An encrypting part 204 encrypts the feature vector by using the random number generated by the random number generating part 203.

A storage part 205 stores various types of data such as the public key. The public key stored in the storage part 205 is a public key generated by the decryption device 103 and distributed by the decryption device 103.

A communication part 206 transmits and receives data to and from another device such as a database.

Figure 3:
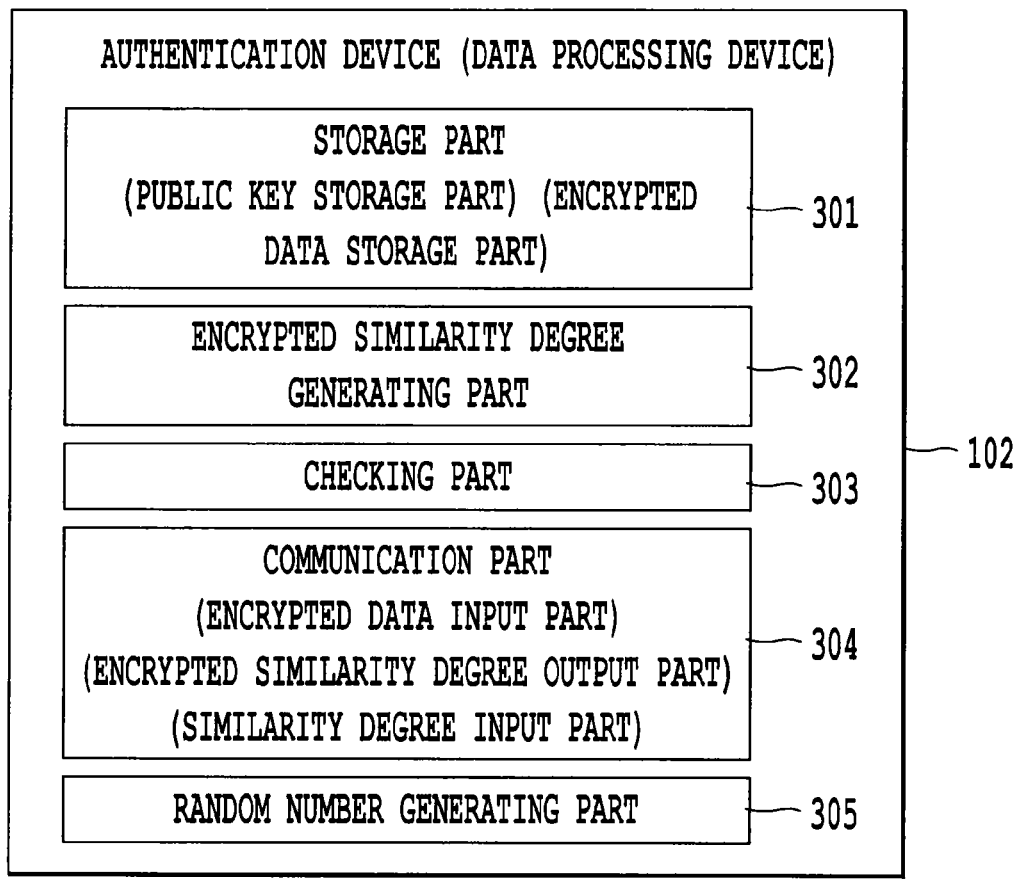
[FIG. 3] is a diagram showing a configuration of an authentication device according to Embodiment 1.

FIG. 3 is a diagram showing an example of the internal configuration of the authentication device 102.

Referring to FIG. 3, a storage part 301 stores various types of data such as a feature vector that has been encrypted (to be also referred to as an encrypted feature vector hereinafter), or a public key. The storage part 301 is an example of a public key storage part and an encrypted data storage part. Note that the encrypted feature vector to be stored in the storage part 301 is a feature vector for registration which is encrypted by the certification device 101. A pre-encryption feature vector for registration corresponds to an example of first data, and the encrypted feature vector corresponds to an example of encrypted first data.

Also, the public key to be stored in the storage part 301 is a public key generated by the decryption device 103 and distributed by the decryption device 103.

An encrypted similarity degree generating part 302 calculates encrypted similarity degree information from the encrypted feature vector registered and the encrypted feature vector for authentication.

The encrypted feature vector for authentication is a feature vector for authentication which is encrypted by the certification device 101. A pre-encryption feature vector for authentication corresponds to an example of the second data, and the encrypted feature vector corresponds to an example of encrypted second data.

The encrypted similarity degree information is encrypted information from which the similarity degree between the feature vector for registration (first data) and the feature vector for authentication (second data) can be derived by the decryption device 103 in accordance with a decryption process using the secret key that has been generated to correspond to the public key.

A checking part 303 performs personal identification based on the decrypted similarity degree and checks whether the user is the correct user. In other words, the checking part 303 analyzes the similarity degree and checks whether or not the source of the feature vector for authentication is correct.

A communication part 304 transmits and receives data to and from the certification device 101 and the decryption device 103.

More specifically, after the encrypted feature vector for registration is stored in the storage part 301, the communication part 304 receives the encrypted feature vector for authentication from the certification device 101.

The communication part 304 also transmits the encrypted similarity degree information generated by the encrypted similarity degree generating part 302 to the decryption device 103.

The communication part 304 also receives the similarity degree (plaintext) between the feature vector for registration and the feature vector for authentication, which is derived by decrypting, using the secret key, the encrypted similarity degree information at the decryption device 103.

The communication part 304 is an example of an encrypted data input part, an encrypted similarity degree output part, and a similarity degree input part.

A random number generating part 305 generates a random number by using a part of the public key.

Figure 4:
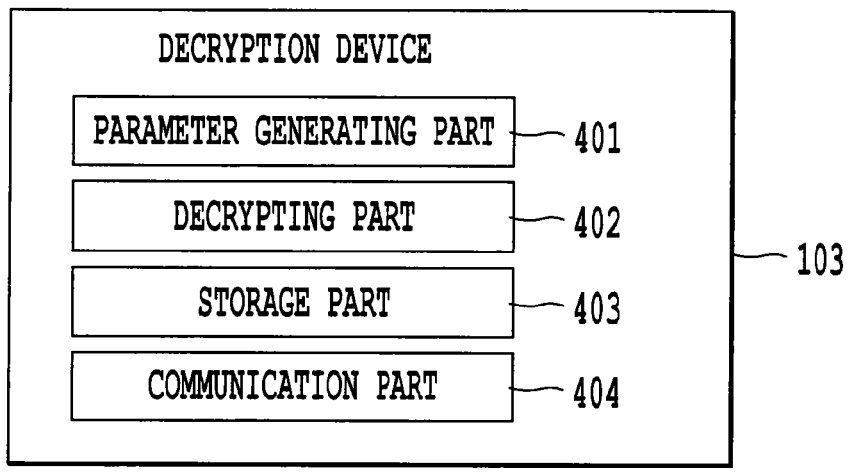
[FIG. 4] is a diagram showing a configuration of a decryption device according to Embodiment 1.

FIG. 4 is a diagram showing an example of the internal configuration of the decryption device 103.

Referring to FIG. 4, a parameter generating part 401 generates a parameter such as a public key or a secret key, which is necessary for encryption and decryption.

A decrypting part 402 decrypts the encrypted similarity degree information to obtain the similarity degree of the plaintext.

A storage part 403 stores various types of data such as the public key or secret key.

A communication part 404 transmits and receives data to and from another device such as a database.

A data processing method according to this embodiment will be described.

The overall perspective on the operation will be described first.

The operation is divided into three parts: a setup process, a registration process, and an authentication process.

In the setup process, the decryption device 103 generates parameters necessary for encryption and decryption.

In the registration process, the certification device 101 encrypts the biometric information of the user and sends the encrypted biometric information to the authentication device 102. The authentication device 102 stores the encrypted biometric information in the storage part 301.

In the authentication process, first, the certification device 101 encrypts the biometric information of a user and sends the encrypted biometric information to the authentication device 102. Then, using the encrypted biometric information of the storage part 301 and the encrypted biometric information received, the authentication device 102 generates encrypted similarity degree information and sends it to the decryption device 103. The decryption device 103 decrypts the similarity degree and sends the decrypted similarity degree to the authentication device 102. Finally, the authentication device 102 compares the similarity degree with the threshold and performs authentication.

The outline of each process will be described hereinafter with reference to FIGS. 21 to 24.

Figure 21:
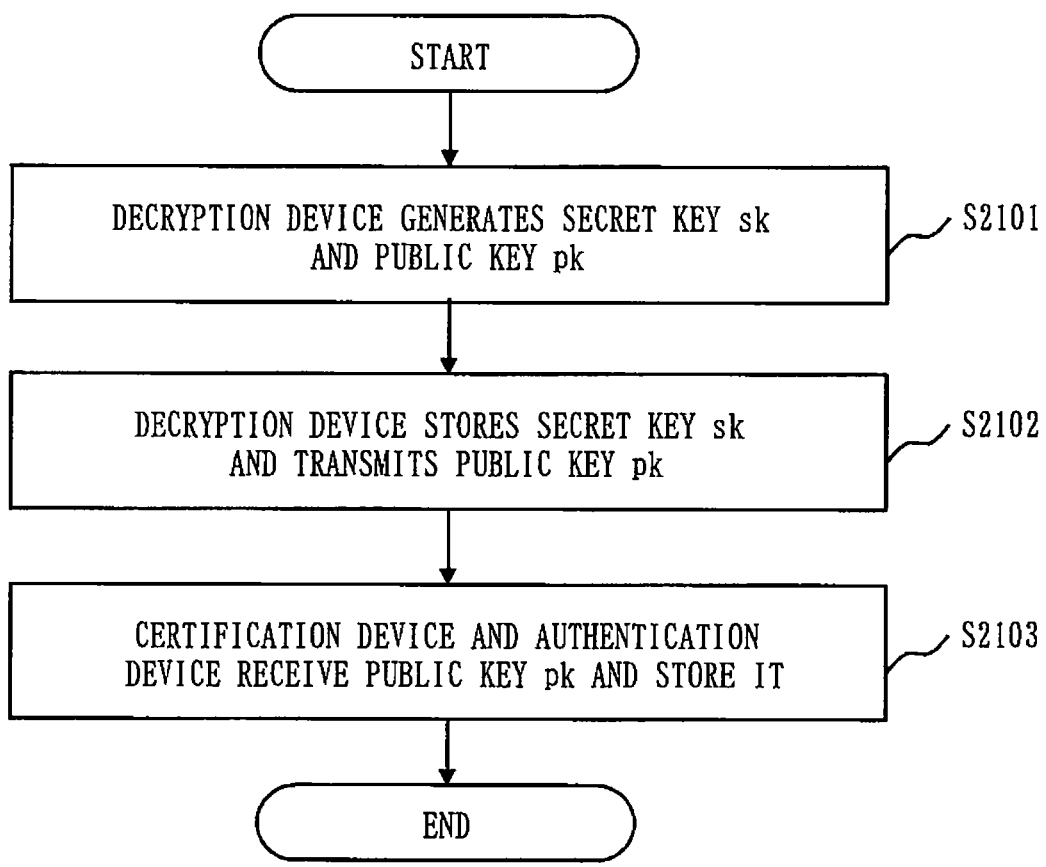
[FIG. 21] is a flowchart showing the outline of the setup process according to Embodiment 1.
Figure 22:
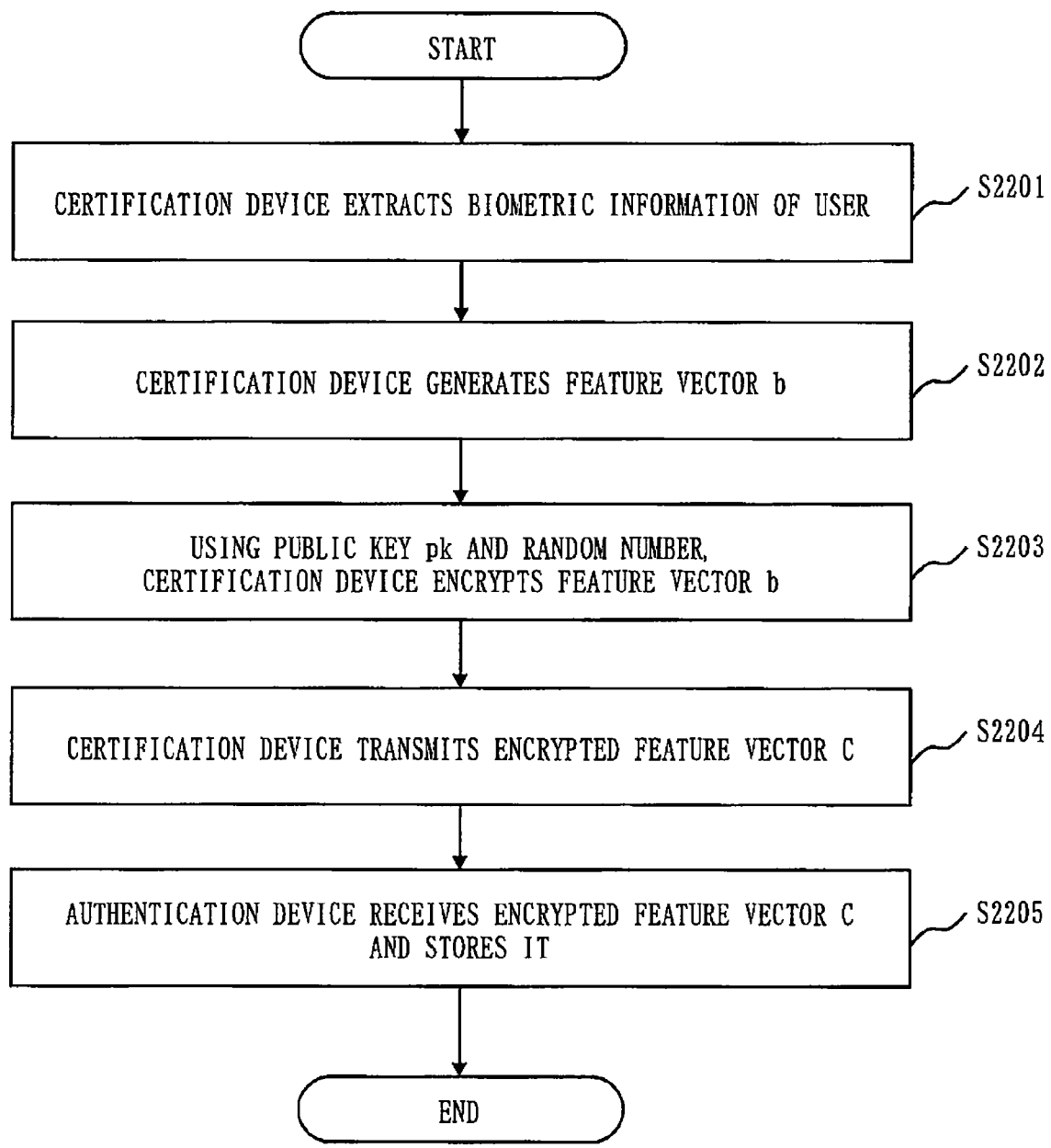
[FIG. 22] is a flowchart showing the outline of the biometric information registration process according to Embodiment 1.
Figure 23:
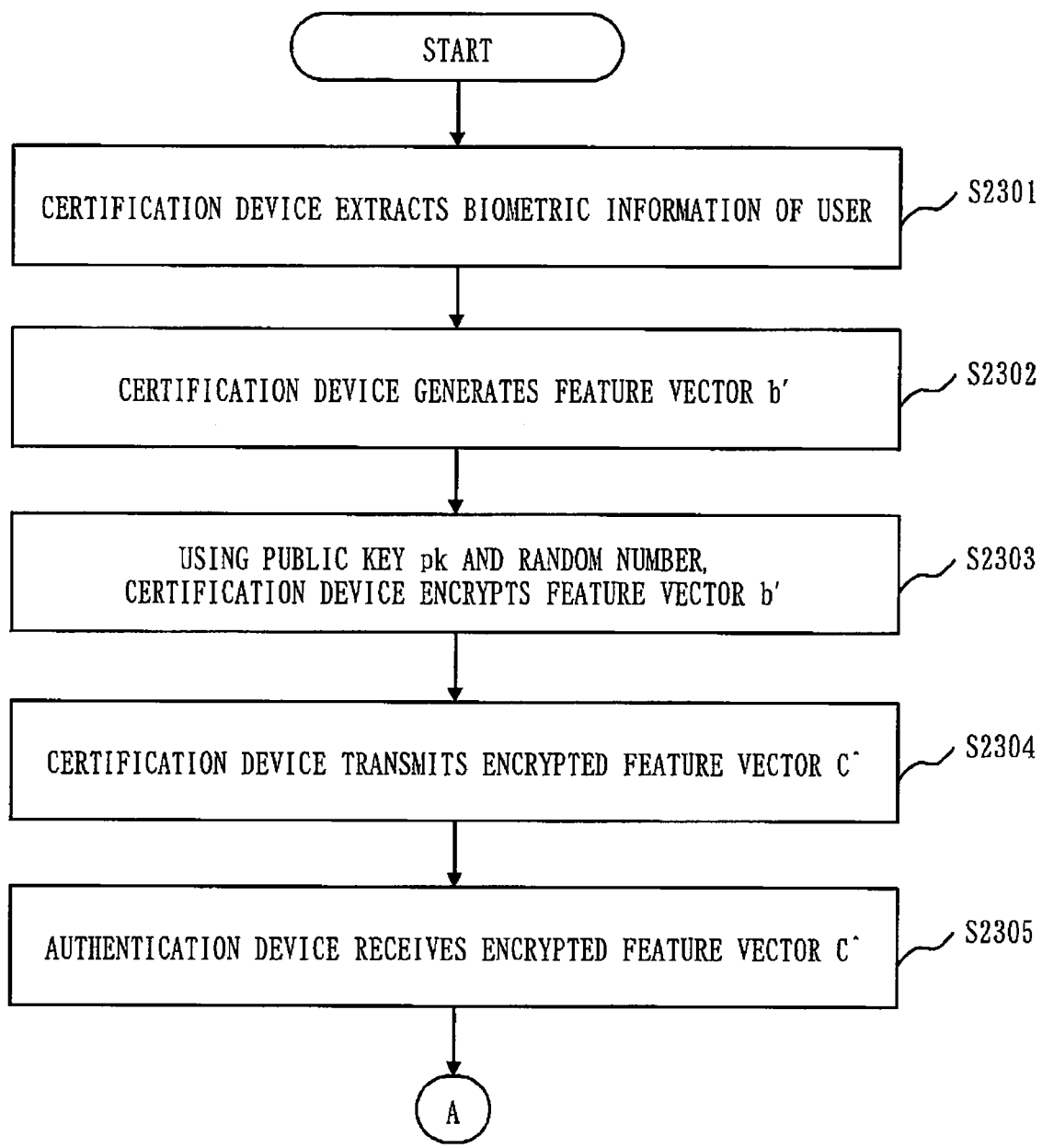
[FIG. 23] is a flowchart showing the outline of the authentication process according to Embodiment 1.
Figure 24:
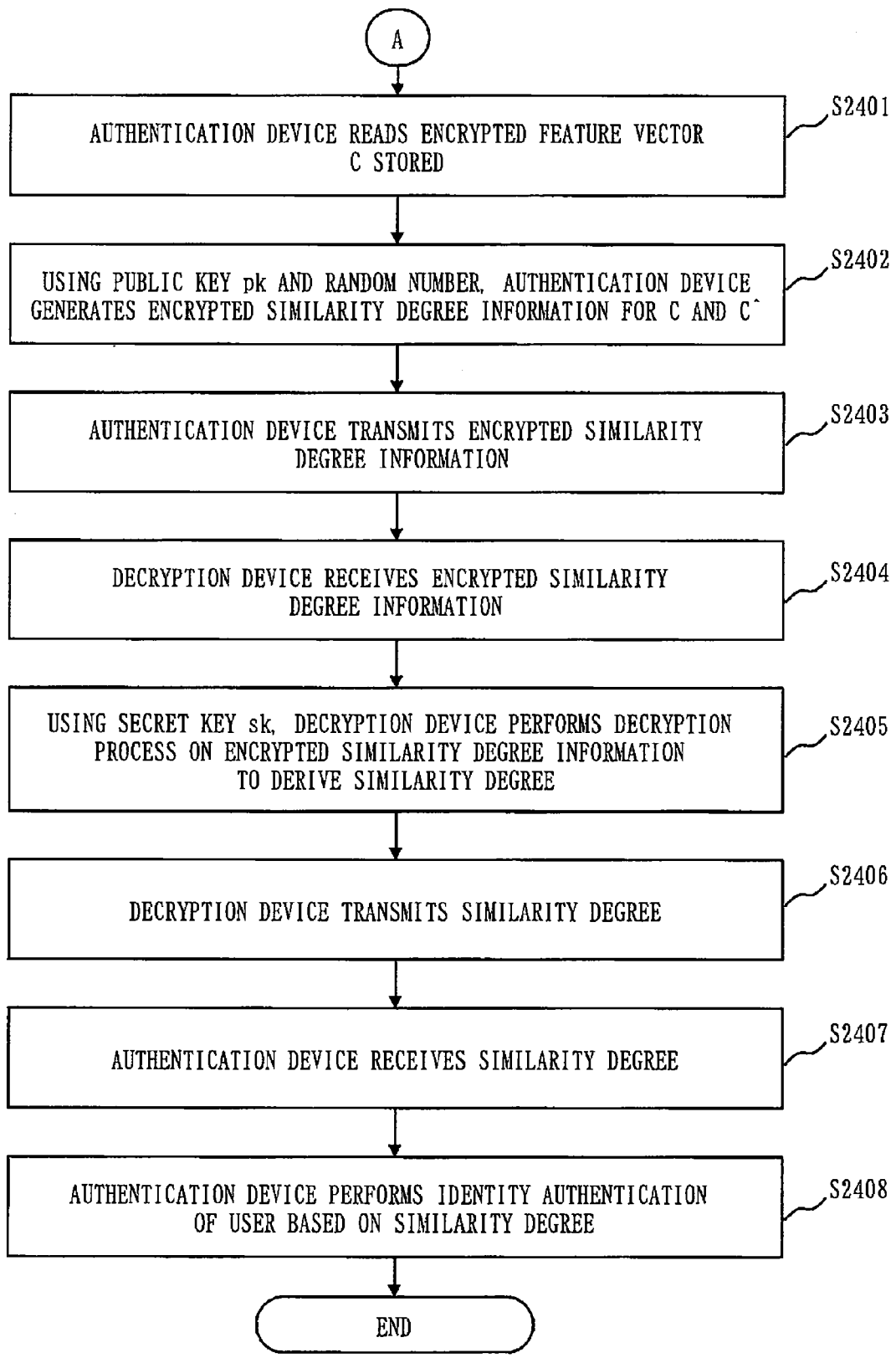
[FIG. 24] is a flowchart showing the outline of the authentication process according to Embodiment 1.

FIG. 21 shows the outline of the setup process, FIG. 22 shows the outline of the registration process, and FIGS. 23 and 24 show the outline of the authentication process.

The outline of the setup process will now be described with reference to FIG. 21.

First, based on the Okamoto-Takashima encryption algorithm, the parameter generating part 401 of the decryption device 103 generates a secret key sk and a public key pk (S2101).

Then, the storage part 403 of the decryption device 103 stores the secret key sk and the communication part 404 transmits the public key pk to the certification device 101 and the authentication device 102 (S2102).

In the certification device 101, the communication part 206 receives the public key pk and the storage part 205 stores the public key pk. In the authentication device 102, the communication part 304 receives the public key pk and the storage part 301 stores the public key pk (S2103).

Although an example where the public key pk is transmitted and received is described, the public key pk may be distributed to the certification device 101 and the authentication device 102 by another method.

For example, the decryption device 103 may store the public key pk in a recording medium. The certification device 101 and the authentication device 102 may read the public key pk from the recording medium and store it.

The outline of the registration process will be described with reference to FIG. 22.

First, in the certification device 101, the biometric information extracting part 201 extracts the biometric information of the user (S2201).

Then, the feature vector forming part 202 of the certification device 101 generates a feature vector b of the biometric information extracted in S2201 (S2202).

Using a part of the public key pk, the random number generating part 203 of the certification device 101 generates a random number. The encrypting part 204 reads the public key pk from the storage part 205. Using the public key pk and the random number, the encrypting part 204 encrypts the feature vector b (S2203).

Then, the communication part 206 of the certification device 101 transmits an encrypted feature vector C to the authentication device 102 (S2204).

The communication part 304 of the authentication device 102 receives the encrypted feature vector C and the storage part 205 stores the encrypted feature vector C (S2205).

The outline of the authentication process will be described with reference to FIGS. 23 and 24.

First, in the certification device 101, the biometric information extracting part 201 extracts biometric information of a user (S2301).

Then, the feature vector forming part 202 of the certification device 101 generates a feature vector b' of the biometric information extracted in S2301 (S2302).

Using a part of the public key pk, the random number generating part 203 of the certification device 101 generates a random number. The encrypting part 204 reads the public key pk from the storage part 205. Using the public key pk and the random number, the encrypting part 204 encrypts the feature vector b' (S2303).

The communication part 206 of the certification device 101 transmits an encrypted feature vector $\hat{C}$ to the authentication device 102 (S2304).

Then, the communication part 304 of the authentication device 102 receives the encrypted feature vector $\hat{C}$ (S2305).

Subsequently, the encrypted similarity degree generating part 302 of the authentication device 102 reads the encrypted feature vector C in the storage part 301 (S2401).

Using a part of the public key pk, the random number generating part 305 of the authentication device 102 generates a random number. The encrypted similarity degree generating part 302 reads the public key pk from the storage part 301. Using the public key pk and the random number, the encrypted similarity degree generating part 302 generates encrypted similarity degree information for the encrypted feature vector C read from the storage part 301 and the encrypted feature vector $\hat{C}$ received from the certification device 101 (S2402).

As the authentication device 102 is unable to know the secret key sk corresponding to the public key pk, the authentication device 102 cannot decrypt the encrypted feature vector C nor the encrypted feature vector $\hat{C}$. Thus, encrypted similarity degree information is generated with both the encrypted feature vector C and encrypted feature vector $\hat{C}$ being kept encrypted.

Subsequently, the communication part 304 of the authentication device 102 transmits the encrypted similarity degree information to the decryption device 103 (S2403).

The communication part 404 of the decryption device 103 receives the encrypted similarity degree information (S2404).

Then, the decrypting part 402 of the decryption device 103 reads the secret key sk from the parameter generating part 401. Using the secret key sk, the decrypting part 402 performs a decryption process on the encrypted similarity degree information, to derive the similarity degree of the plaintext (S2405).

The communication part 404 of the decryption device 103 transmits the similarity degree of the plaintext to the authentication device 102 (S2406). The similarity degree is information that indicates to what extent the feature vector b for registration and the feature vector b' for authentication are similar to each other. The feature vector and the biometric information cannot be calculated from the similarity degree.

Then, the communication part 304 of the authentication device 102 receives the similarity degree of the plaintext (S2407).

The checking part 303 of the authentication device 102 checks whether or not the similarity degree of the plaintext is equal to or larger than a predetermined threshold. If the similarity degree of the plaintext is equal to or larger than the threshold, it is determined that the user is the correct user; if smaller than the threshold, it is determined that the user is not the correct user (S2408).

The operations of the respective processes will now be described in more detail with reference to FIGS. 5 to 9.

Figure 5:
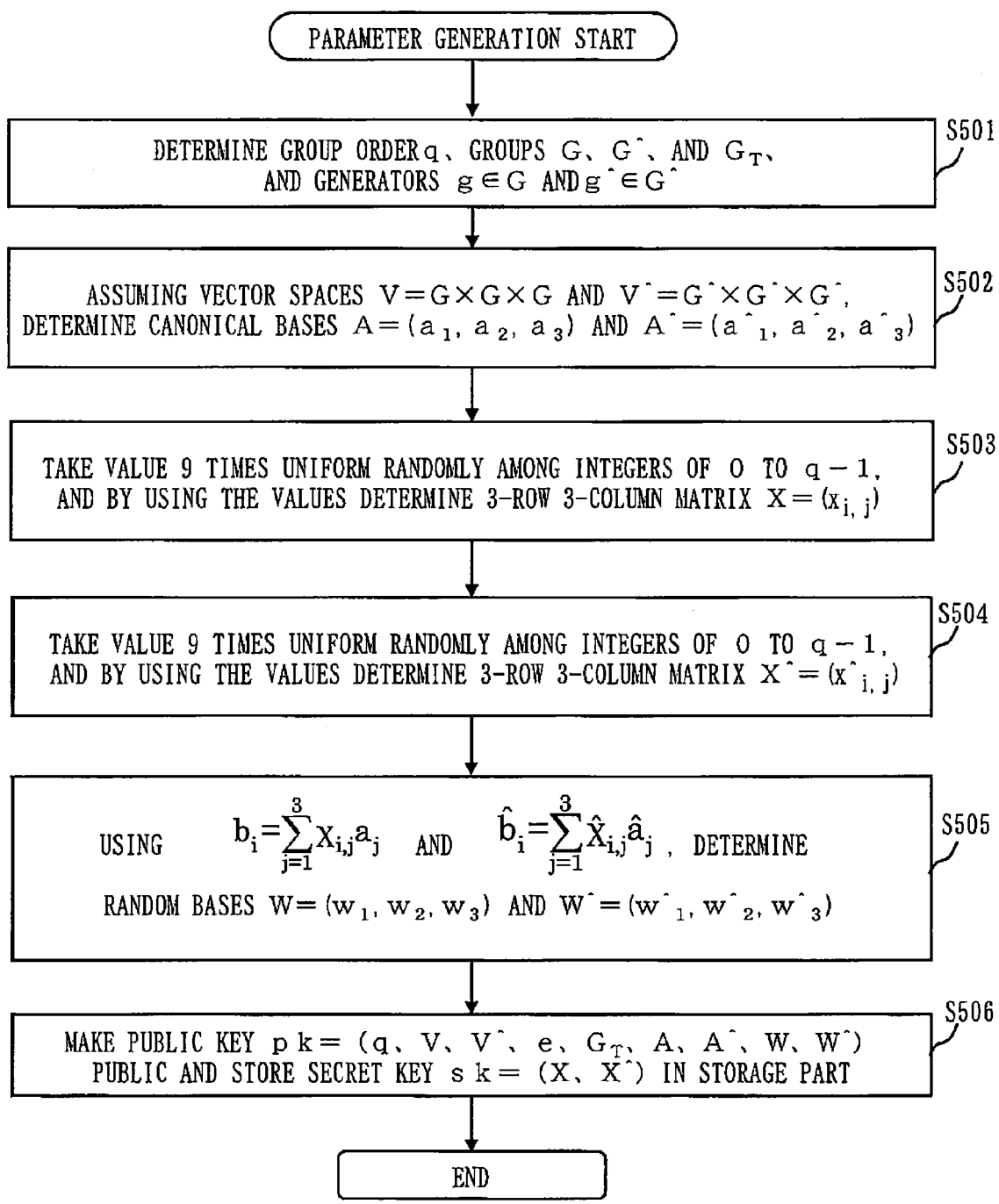
[FIG. 5] is a flowchart showing an example of a setup process according to Embodiment 1.
Figure 6:
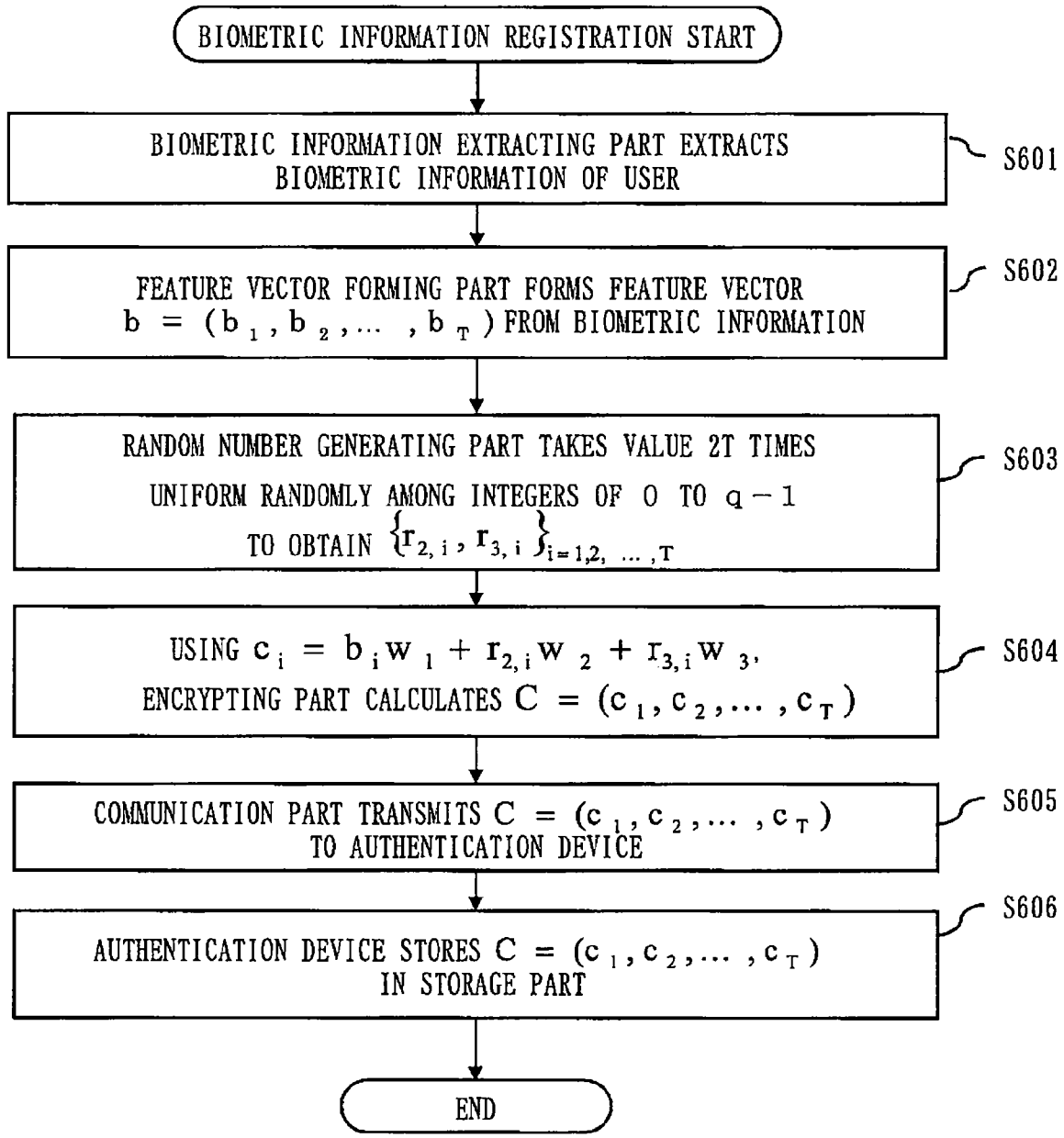
[FIG. 6] is a flowchart showing an example of a biometric information registration process according to Embodiment 1.
Figure 7:
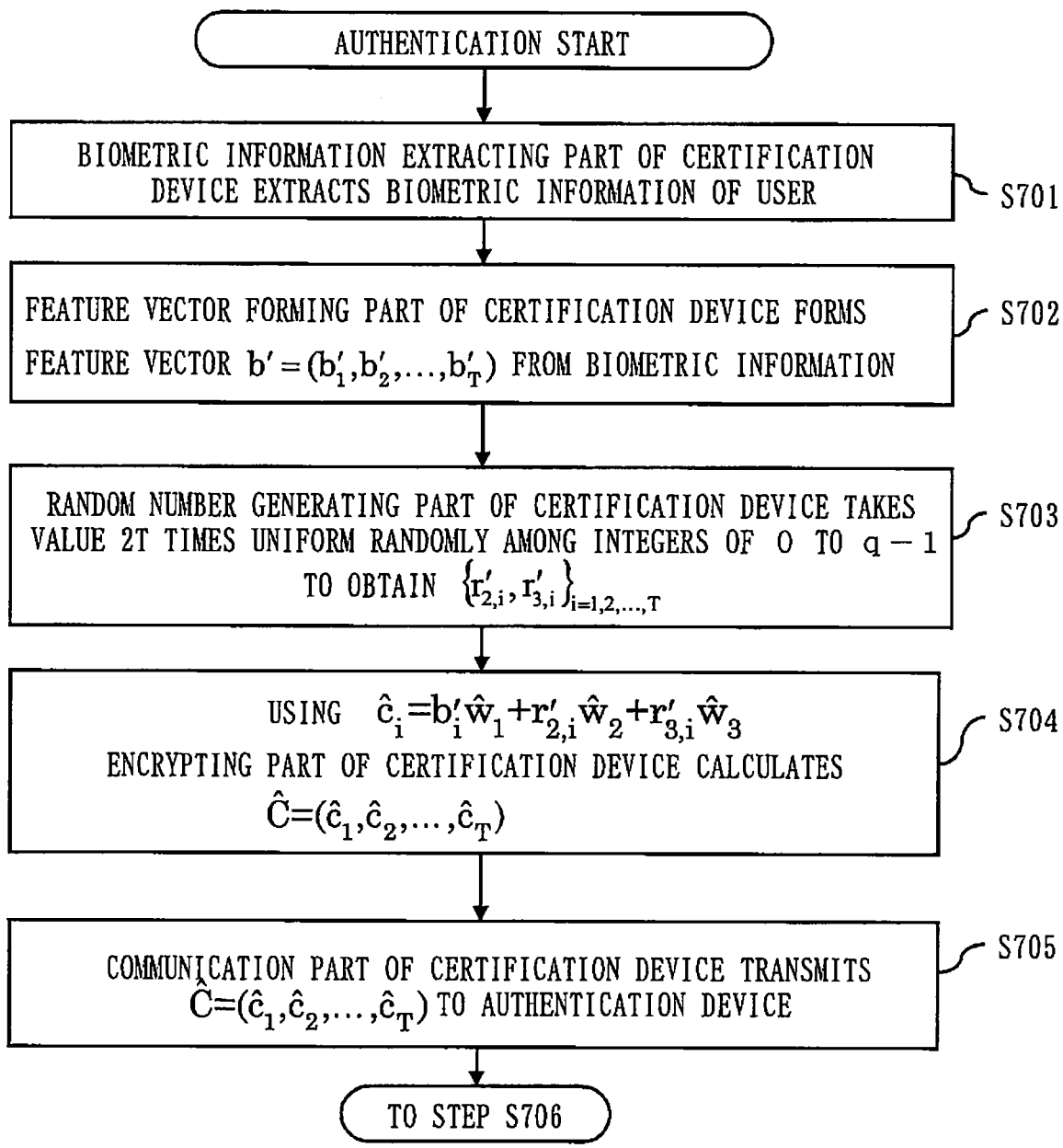
[FIG. 7] is a flowchart showing an example of an authentication process according to Embodiment 1.
Figure 8:
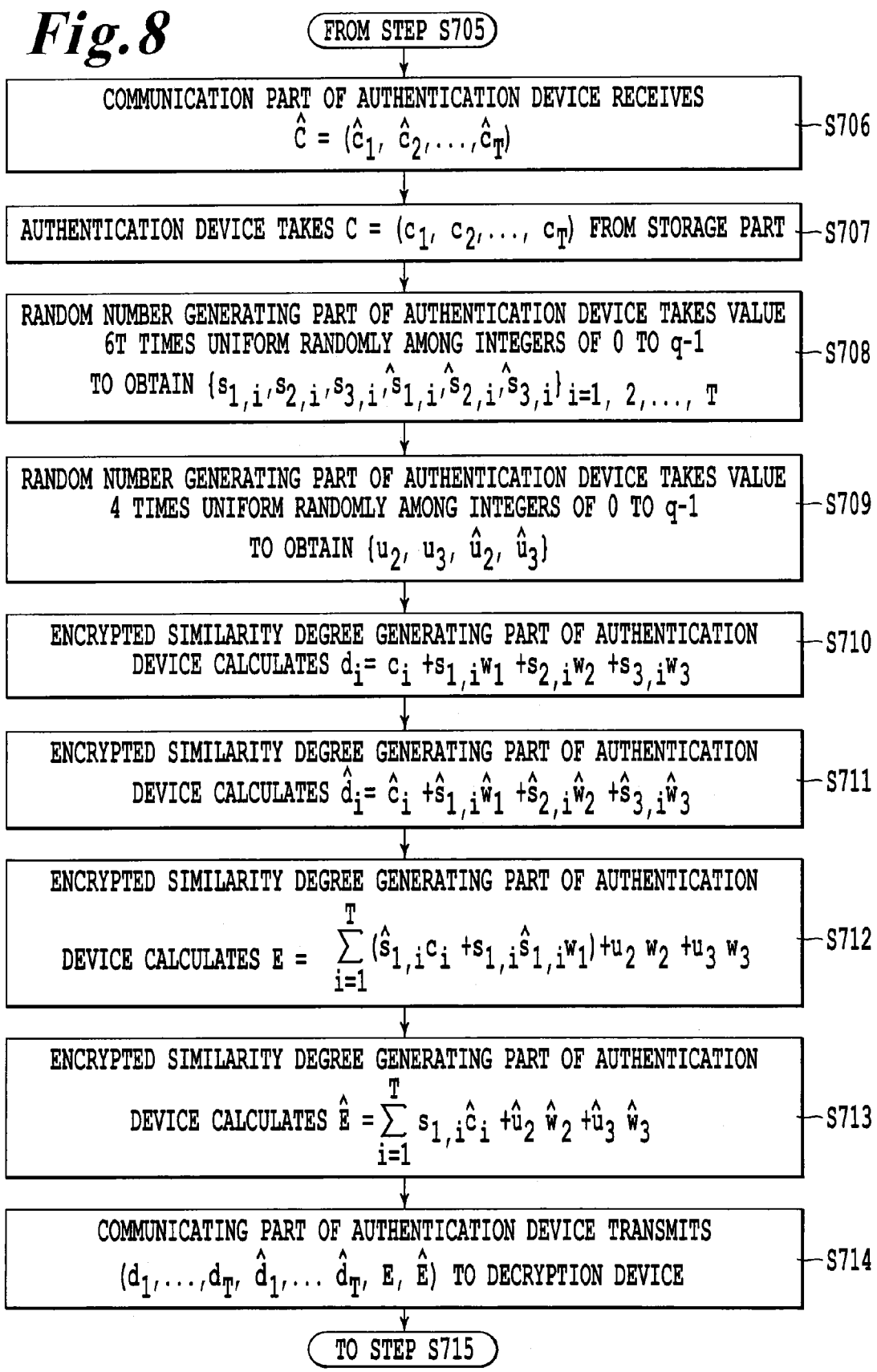
[FIG. 8] is a flowchart showing the example of the authentication process according to Embodiment 1.
Figure 9:
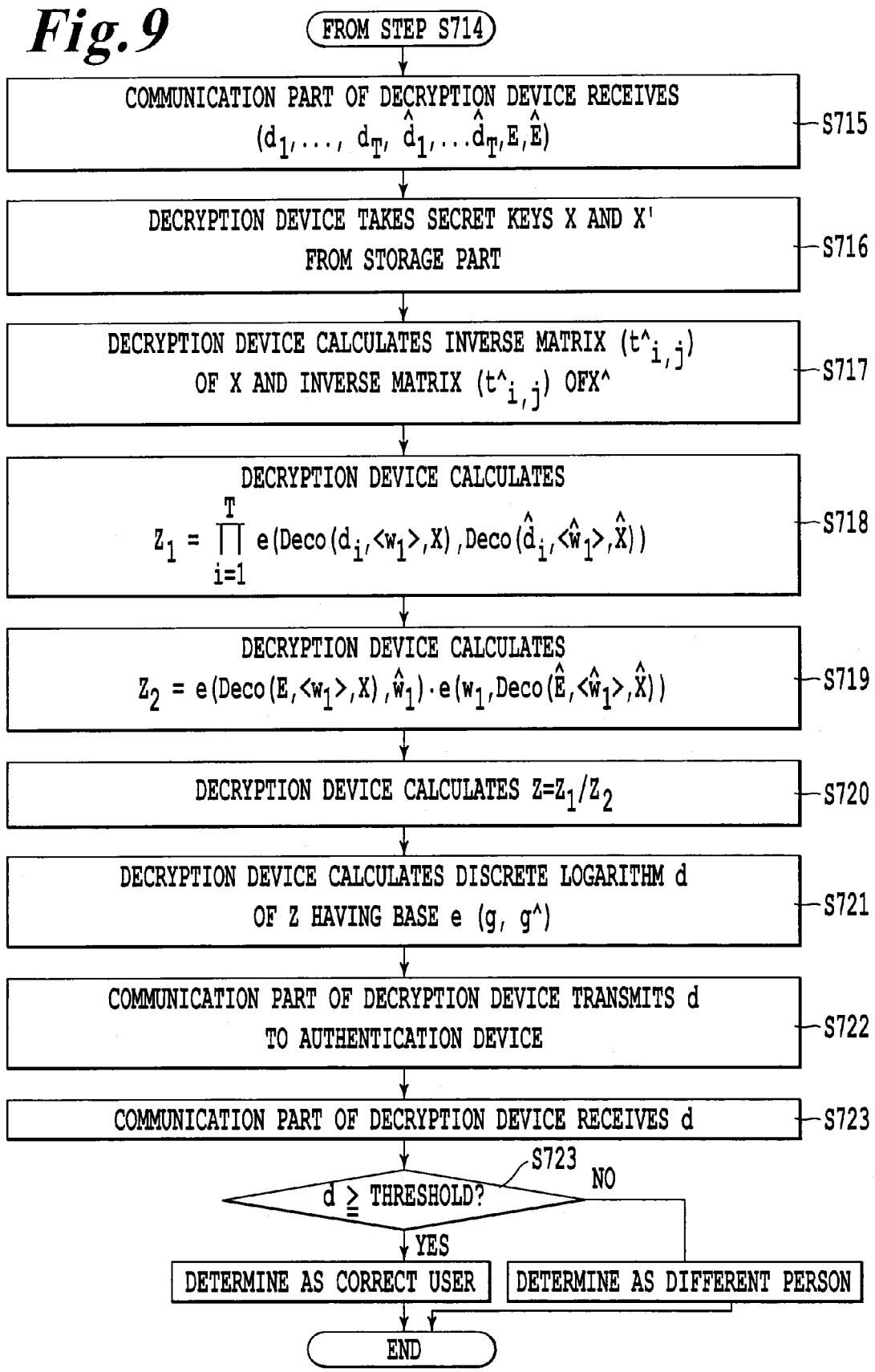
[FIG. 9] is a flowchart showing the example of the authentication process according to Embodiment 1.

FIG. 5 shows the setup process in detail. FIG. 6 shows the registration process in detail. FIGS. 7 to 9 show the authentication process in detail.

The setup will be described with reference to FIG. 5.

In the setup, the decryption device 103 generates the public key pk and the secret key sk.

The public key pk and the secret key sk may be a public key and a secret key that are different among users. Alternatively, one public key and one secret key may be provided to one system.

For the sake of explanatory simplicity, a case will be described where one public key and one secret key are provided to one system. This case can be easily extended to a case where a different public key and a different secret key are provided to a different user.

FIG. 5 is a flowchart showing the procedure of generating the public key pk and the secret key sk in the parameter generating part 401.

First, in step S501, the parameter generating part 401 determines a group order q, groups G, G^, and $G_T$, and generators g∈G and g^∈G^.

A practical determining method is described in, for example, Non-Patent Literature 4, and will accordingly be omitted.

Note that the group order is determined according to the security level, and usually a large-size prime number having, for example, 200 bits or 1024 bits is employed as the group order.

In step S502, assuming vector spaces V=G×G×G and V^=G^×G^×G^, the parameter generating part 401 determines canonical bases A=($a_1$, $a_2$, $a_3$) and A^=($a^{\hat{}}_1$, $a^{\hat{}}_2$, $a^{\hat{}}_3$).

This determining method has previously been described.

In step S503, the parameter generating part 401 takes a value nine times uniform randomly among integers of 0 to q−1, and by using the obtained values, determines a 3-row 3-column matrix X=($X_{i,j}$).

This matrix should be a regular matrix. When a matrix is determined by this method, the resultant matrix will be a regular matrix at a very high probability. For further accuracy, after determining a matrix in this manner, the regularity may be checked by, for example, calculating a determinant. If the matrix is not regular, the elements of the matrix may be selected again randomly.

In step S504, the parameter generating part 401 takes a value nine times uniform randomly among integers of 0 to q−1, and by using the obtained values, determines a 3-row 3-column matrix X^=($X^{\hat{}}_{i,j}$).

The obtained matrix will be a regular matrix at a very high probability. If not, the elements of the matrix may be selected again randomly.

In step S505, in accordance with the following Numerical Expressions 9 and 10, the parameter generating part 401 determines random bases W=($w_1$, $w_2$, $w_3$) and W^=($w^{\hat{}}_1$, $w^{\hat{}}_2$, $w^{\hat{}}_3$).

$$w_i = \sum_{j=1}^{3} \chi_{i,j} a_j \quad \text{[Numerical Expression 9]}$$

$$\hat{w}_i = \sum_{j=1}^{3} \hat{\chi}_{i,j} \hat{a}_j \quad \text{[Numerical Expression 10]}$$

Finally, in step S506, the parameter generating part 401 makes public the public key pk=(q, V, V^, e, $G_T$, A, A^, W, W^), and the secret key sk=(X, X^) is stored in the storage part 403.

A biometric information registration method will be described with reference to FIG. 6.

A case will be described wherein the user registers biometric information in the authentication device 102 via the certification device 101. Registration of the biometric information in the authentication device 102 directly, or via a registration dedicated device, can be realized in accordance with the same procedure.

FIG. 6 is a flowchart showing the procedure of registering the biometric information in the certification device 101.

First, in step S601, the biometric information extracting part 201 extracts the biometric information of the user.

Extraction can be performed by various methods. For example, the biometric information of the user is extracted by exposing the fingerprint to light and reading its pattern with a sensor.

In step S602, the feature vector forming part 202 forms a feature vector b=($b_1$, $b_2$, ..., $b_T$) from the biometric information.

T represents the size of an array that stores the feature vector, and is a value determined depending on the feature-vector forming methods.

According to the forming method of this embodiment, the readout pattern is divided into areas, and the presence/absence of a feature point in each area is detected.

If a feature point is present in an area, 1 is stored at a corresponding position in the array; if not, 0 is stored at the corresponding position in the array.

In step S603, the random number generating part 203 takes a value 2T times uniform randomly among integers of 0 to q−1, so that $\{r_{2,i}, r_{3,i}\}_{i=1, 2, ..., T}$ is obtained.

Note that q in q−1 is q included in the public key pk.

In step S604, using $c_i = b_i w_1 + r_{2,i} w_2 + r_{3,i} w_3$, the encrypting part 204 calculates the encrypted feature vector C=($c_1$, $c_2$, ..., $c_T$).

Note that $w_1$, $w_2$, and $w_3$ have been distributed by the decryption device 103 as a part (W) of the public key.

In step S605, the communication part 206 transmits the encrypted feature vector C=($c_1$, $c_2$, ..., $C_T$) to the authentication device 102.

In the transmission, a communication manipulation detection technique such as SSL (Secure Sockets Layer) may be desirably employed so manipulation will not be conducted during communication.

Finally, in step S606, the communication part 304 in the authentication device 102 receives the encrypted feature vector C=($c_1$, $c_2$, ..., $C_T$) and stores it in the storage part 301.

The authentication method will be described with reference to FIGS. 7 to 9.

For the sake of simplicity, a case of so-called 1:1 authentication will be described where, in the authentication, the user as the authentication target is separately specified by ID information or the like.

FIGS. 7, 8, and 9 are flowcharts showing the procedure of authentication.

First, in step S701, the biometric information extracting part 201 of the certification device 101 extracts the biometric information of the user.

The extracting method is the same as that employed in the biometric information registration.

In step S702, the feature vector forming part 202 of the certification device 101 forms a feature vector $b'=(b'_1, b'_2, \ldots, b'_T)$ from the biometric information.

The forming method is the same as that employed for biometric information registration.

In step S703, the random number generating part 203 of the certification device 101 takes a value 2T times uniform randomly among integers of 0 to q−1 to obtain $\{r'_{2,i}, r'_{3,i}\}_{i=1, 2, \ldots, T}$.

In step S704, using $c\hat{}_i=(b'_i w\hat{}_1 + r'_{2,i} w\hat{}_2 + r'_{3,i} w\hat{}_3)$, the encrypting part 204 of the certification device 101 calculates the encrypted feature vector $C\hat{}=(c\hat{}_1, c\hat{}_2, \ldots, c\hat{}_T)$.

Note that $w\hat{}_1$, $w\hat{}_2$, and $w\hat{}_3$ have been distributed by the decryption device 103 as a part ($W\hat{}$) of the public key.

In step S705, the communication part 206 of the certification device 101 transmits the encrypted feature vector $C\hat{}=(c\hat{}_1, c\hat{}_2, \ldots, c\hat{}_T)$ to the authentication device 102.

In the transmission, a communication manipulation detection technique such as SSL may be desirably employed so manipulation will not be conducted during communication.

In step S706, the communication part 304 in the authentication device 102 receives the encrypted feature vector $C\hat{}=(c\hat{}_1, c\hat{}_2, \ldots, c\hat{}_T)$.

In step S707, the encrypted similarity degree generating part 302 in the authentication device 102 takes the encrypted feature vector $C=(c_1, c_2, \ldots, c_T)$ from the storage part 301.

In general, encrypted biometric information of a large number of users are stored in the storage part 301, and which information to take is determined using separately provided ID information.

In step S708, the random number generating part 305 of the authentication device 102 takes a value 6T times uniform randomly among integers of 0 to q−1 to obtain $\{s_{1,i}, s_{2,i}, s_{3,i}, s\hat{}_{1,i}, s\hat{}_{2,i}, s\hat{}_{3,i}\}_{i=1, 2, \ldots, T}$.

In step S709, the random number generating part 305 of the authentication device 102 takes a value 4 times uniform randomly among integers of 0 to q−1 to obtain $\{u_2, u_3, u\hat{}_2, u\hat{}_3\}$.

In step S710, the encrypted similarity degree generating part 302 of the authentication device 102 calculates $d_i = c_i + s_{1,i} w_1 + s_{2,i} w_2 + s_{3,i} w_3$.

The encrypted similarity degree generating part 302 performs this calculation for every $i=1, 2, \ldots, T$.

Note that $w_1$, $w_2$, and $w_3$ have been distributed by the decryption device 103 as a part ($W$) of the public key.

In step S711, the encrypted similarity degree generating part 302 of the authentication device 102 calculates $d\hat{}_i = c\hat{}_i + s\hat{}_{1,i} w\hat{}_1 + s\hat{}_{2,i} w\hat{}_2 + s\hat{}_{3,i} w\hat{}_3$.

The encrypted similarity degree generating part 302 performs this calculation for every $i=1, 2, \ldots, T$.

Note that $w\hat{}_1$, $w\hat{}_2$, and $w\hat{}_3$ have been distributed by the decryption device 103 as a part ($W\hat{}$) of the public key.

In step S712, the encrypted similarity degree generating part 302 of the authentication device 102 calculates E in accordance with Numerical Expression 11.

[Numerical Expression 11]
$$E = \sum_{i=1}^{T} (\hat{s}_{1,i} c_i + s_{1,i} \hat{s}_{1,i} w_1) + u_2 w_2 + u_3 w_3$$

In step S713, the encrypted similarity degree generating part 302 of the authentication device 102 calculates $E\hat{}$ in accordance with Numerical Expression 12.

[Numerical Expression 12]
$$\hat{E} = \sum_{i=1}^{T} s_{1,i} \hat{c}_i + \hat{u}_2 \hat{w}_2 + \hat{u}_3 \hat{w}_3$$

In step S714, the communication part 304 of the authentication device 102 transmits $(d_1, \ldots, d_T, d\hat{}_1, \ldots, d\hat{}_T, E, E\hat{})$ to the decryption device 103.

In the transmission, a communication manipulation detection technique such as SSL may be desirably employed so manipulation will not be conducted during communication.

Note that $(d_1, \ldots d_T, d\hat{}_1, \ldots, d\hat{}_T, E, E\hat{})$ described above collectively constitutes the encrypted similarity degree information.

In step S715, the communication part 404 of the decryption device 103 receives $(d_1, \ldots, d_T, d\hat{}_T, \ldots, d\hat{}_T, E, E\hat{})$.

In step S716, the decrypting part 402 of the decryption device 103 takes the secret key $sk=(X, X\hat{})$ from the storage part 403.

In step S717, the decrypting part 402 of the decryption device 103 calculates an inverse matrix $X^{-1}=(t_{i,j})$ of X and an inverse matrix $X\hat{}^{-1}=(t\hat{}_{i,j})$ of $X\hat{}$.

Instead of calculating these values each time, calculated values may be stored in the storage part 403 in advance and taken out.

In step S718, the decryption device 103 calculates $Z_1$ in accordance with Numerical Expression 13.

[Numerical Expression 13]
$$Z_1 = \prod_{i=1}^{T} e(\text{Deco}(d_i, \langle w_1 \rangle, X),$$
$$\text{Deco}(\hat{d}_i, \langle \hat{w}_1 \rangle, \hat{X}))$$

The Deco algorithm is calculated in accordance with the following Numerical Expression 14. Note that k in Numerical Expression 14 is an integer.

[Numerical Expression 14]
$$\text{Deco}(d_i, \langle w_1 \rangle, X):$$
$$y = \sum_{i=1}^{3} \sum_{k=1}^{3} t_{i,1} x_{1,k} \phi_{k,i}(d_i)$$
$$\text{Deco}(\hat{d}_i, \langle \hat{w}_1 \rangle, \hat{X}):$$
$$\hat{y} = \sum_{i=1}^{3} \sum_{k=1}^{3} \hat{t}_{i,1} \hat{x}_{1,k} \phi_{k,i}(\hat{d}_i)$$

In step S719, the decrypting part 402 of the decryption device 103 calculates $Z_2 = e(\text{Deco}(E, \langle w_1 \rangle, X), w\hat{}_1) \cdot e(w_1, \text{Deco}(E\hat{}, \langle w\hat{}_1 \rangle, X\hat{}))$.

This Deco algorithm is calculated in the same manner as described above.

In step S720, the decrypting part 402 of the decryption device 103 calculates $Z = Z_1 / Z_2$.

In step S721, the decrypting part 402 of the decryption device 103 calculates a discrete logarithm d of Z having a base $e(g, g\hat{})$.

This discrete logarithm d corresponds to the number of coincidences of feature points and represents the similarity degree.

Calculation of a discrete logarithm is regarded difficult for the current computer performance. A small d, however, can be calculated efficiently.

In this embodiment, since d is sufficiently smaller as compared to the order q, it can be calculated efficiently.

In step S722, the communication part 404 of the decryption device 103 transmits the similarity degree d to the authentication device 102.

In the transmission, a communication manipulation detection technique such as SSL may be desirably employed so manipulation will not be conducted during communication.

In step S723, the communication part 304 of the authentication device 102 receives the similarity degree d.

In step S724, whether or not the similarity degree d is equal to or larger than the threshold is checked.

The threshold is a value determined by the system in advance by taking into account various factors such as the type of biometric information to be utilized or the security requirements.

If the similarity degree d is equal to or larger than the threshold, it is determined that the encrypted biometric information sent from the certification device 101 belongs to the correct user specified by the ID.

If the similarity degree d is less than the threshold, it is determined that the encrypted biometric information sent from the certification device 101 does not belong to the correct user specified by the ID but belongs to a different person.

Through the above steps, the authentication device 102 can perform biometric authentication with the certification device 101.

According to the above embodiment, the feature vector is not stored in the authentication device 102 as it is, but is stored in an encrypted state. This can decrease the risk for the user that the feature vector which is privacy information might be secretly read by the administrator of the authentication device 102.

On the side of the authentication device 102, even if the encrypted feature vector should leak, the original feature vector itself will not leak. Thus, the data administration work can be reduced as compared to a case where the feature vector itself is stored.

According to the procedure of this embodiment, the decryption device 103 can decrypt only the similarity degree which is an index, and cannot decrypt the feature vector.

Unless the certification device 101 and decryption device 103 work together, the feature vector will not be exposed in the authentication process. Therefore, biometric authentication with the biometric information being kept secret is possible.

According to this embodiment, in authentication, once the certification device 101 sends an encrypted feature vector to the authentication device 102, the authentication process can be conducted between the authentication device 102 and the decryption device 103. In 1:N authentication particularly, communication need not be performed between the certification device 101 and the authentication device 102 the number of times proportional to the number of users. As a result, the communication amount can be decreased.

Also, according to this embodiment, in authentication, once the certification device 101 sends an encrypted feature vector to the authentication device 102, the authentication process can be conducted between the authentication device 102 and the decryption device 103. Hence, the biometric information acquired in the certification device 101 can be deleted immediately.

As a result, the risk of biometric information theft in the certification device 101 can be diminished.

In this embodiment, in constructing the feature vector, 1 is stored at a position where a feature point is present, and 0 is stored at a position where a feature point is not present. The inner product is calculated using vectors each constituted of 1 and 0. The concept of significance may be introduced additionally, and a significant feature point may be weighted (for example, 5 is stored in place of 1).

With this structure, when compared to a case where simply the inner product is calculated, biometric authentication that is more precise can be realized.

In this embodiment, a method using three-dimensional dual pairing vector spaces is disclosed. Three-dimensional is merely an example, and the vector space need not always be three-dimensional.

The present invention can be practiced with, for example, a two-dimensional vector space, a four-dimensional vector space, or a further higher-dimensional vector space.

In the case of a two-dimensional vector space, the present invention may be practiced by removing vectors $w_3$ and $\hat{w}_3$ appearing in the above embodiment.

This can reduce the calculation amount in the registration and authentication of the biometric information.

In the case of a four-dimensional vector space or a further higher-dimensional vector space, the additional vectors may serve the same roles of $w_2$, $w_3$, $\hat{w}_2$, and $\hat{w}_3$.

More specifically, when calculating $c_i$, $\hat{c}_i$, $d_i$, and $\hat{d}_i$, the additional vectors may be multiplied by a random-number factor and summed with $w_2$, $w_3$, $\hat{w}_2$, and $\hat{w}_3$, respectively.

Then, a ciphertext that is more difficult to decipher can be formed, thus improving the security.

In this embodiment, for improving the security, in authentication, $\{u_2, u_3, \hat{u}_2, \hat{u}_3\}$ is selected in step S709 and is used in step S712 and step S713. Alternatively, these steps can be omitted.

This eliminates the procedure of authentication, thus reducing the calculation amount.

Embodiment 2.

Embodiment 1 described above discloses the authentication method wherein biometric authentication is performed using the number of coincidences of feature points as the performance index. An authentication method will now be described below wherein biometric authentication is performed using the hamming distance or Euclidean squared distance between the feature vectors.

A configuration example of a biometric authentication system according to this embodiment is the same as that shown in FIG. 1.

The examples of the internal configurations of the certification device 101, authentication device 102, and decryption device 103 according to this embodiment are the same as those shown in FIGS. 2 to 4.

According to this embodiment, T pieces of arrays are prepared in the same manner as in Embodiment 1, thus constituting a feature vector. As the similarity degree index, the hamming distance or Euclidean squared distance between two feature vectors is employed. Assume that the two feature vectors are $b=(b_1, b_2, \ldots, b_T)$ and $b'=(b'_1, b'_2, \ldots, b'_T)$.

The hamming distance between the two feature vectors is given by Numerical Expression 15 (note that $b'_i$, $b'_i \in \{0, 1\}$), and the Euclidean squared distance between two feature vectors is given by Numerical Expression 16.

[Numerical Expression 15]

$$d_H(b, b') = \sum_{i=1}^{T} (b_i \oplus b'_i) = \sum_{i=1}^{T} (b_i - b'_i)^2$$

[Numerical Expression 16]

$$d_{E2}(b, b') = \sum_{i=1}^{T} (b_i - b'_i)^2.$$

A parameter generating method according to this embodiment is the same as that shown in FIG. 5 of Embodiment 1, and a description thereof will accordingly be omitted.

A biometric information registration method will be described with reference to FIG. 10.

A case will be described wherein the user registers biometric information in the authentication device 102 via the certification device 101. Registration of the biometric information in the authentication device 102 directly, or via a registration dedicated device, can be realized in accordance with the same procedure.

FIG. 10 is a flowchart showing the procedure of registering the biometric information in the certification device 101.

Step S1001 and step S1002 are the same as their counterparts in Embodiment 1.

Note that with the hamming distance, $b_i \in \{0, 1\}$ is satisfied, and with the Euclidean squared distance, $b_i \in \{0, 1, \ldots, q-1\}$ is satisfied.

Then, in step S1003, the random number generating part 203 takes a value 4T times uniform randomly among integers of 0 to q−1, so that $\{r_{2,i}, r^{3,i}, \hat{r}_{2,i}, \hat{r}_{3,i}\}_{i=1,2,\ldots,T}$ is obtained.

In step S1004, using $c_i = b_i w_1 + r_{2,i} w_2 + r_{3,i} w_3$ and $\hat{c}_i = b_i \hat{w}_1 + \hat{r}_{2,i} \hat{w}_2 + \hat{r}_{3,i} \hat{w}_3$, the encrypting part 204 calculates the encrypted feature vectors $C = (c_1, c_2, \ldots, c_T)$ and $\hat{C} = (\hat{c}_1, \hat{c}_2, \ldots, \hat{c}_T)$.

Note that $w_1, w_2$, and $w_3$ and $\hat{w}_1, \hat{w}_2$, and $\hat{w}_3$ have been distributed by the decryption device 103 as parts (W and W^) of the public key.

In step S1005, the communication part 206 transmits the encrypted feature vectors $C = (c_1, c_2, \ldots, c_T)$ and $\hat{C} = (\hat{c}_1, \hat{c}_2, \ldots, \hat{c}_T)$ to the authentication device 102.

In the transmission, a communication manipulation detection technique such as SSL may be desirably employed so manipulation will not be conducted during communication.

Finally, in step S1006, the authentication device 102 stores the encrypted feature vectors $C = (c_1, c_2, \ldots, c_T)$ and $\hat{C} = (\hat{c}_1, \hat{c}_2, \ldots, \hat{c}_T)$ and stores them in the storage part 301.

Figure 12:
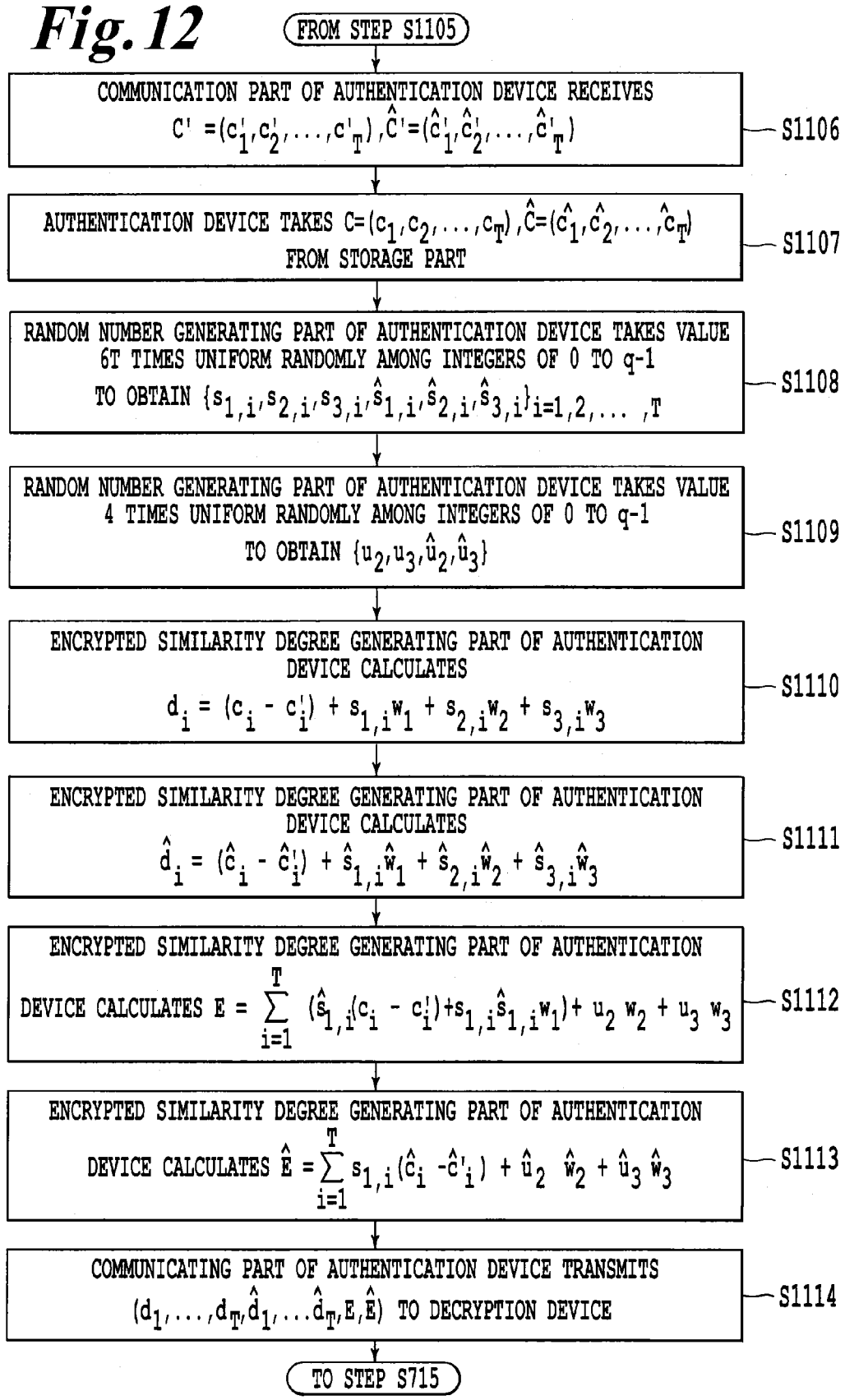
[FIG. 12] is a flowchart showing the example of the authentication process according to Embodiment 2.

The authentication method will be described with reference to FIGS. 11, 12, and 13.

For the sake of simplicity, a case of so-called 1:1 authentication will be described where, in the authentication, the user as the authentication target is separately specified by ID information or the like.

Step S1101 and step S1102 are the same as their counterparts in Embodiment 1.

Note that with the hamming distance, $b'_i \in \{0, 1\}$ is satisfied, and with the Euclidean squared distance, $b'_i \in \{0, 1, \ldots, q-1\}$ is satisfied.

In step S1103, the random number generating part 203 of the certification device 101 takes a value 4T times uniform randomly among integers of 0 to q−1 to obtain $\{r'_{2,i}, r'_{3,i}, \hat{r}'_{2,i}, \hat{r}'_{3,i}\}_{i=1,2,\ldots,T}$.

In step S1104, using $c'_i = b'_i w_1 + r'_{2,i} w_2 + r'_{3,i} w_3$ and $\hat{c}'_i = b'_i \hat{w}_1 + \hat{r}'_{2,i} \hat{w}_2 + \hat{r}'_{3,i} \hat{w}_3$, the encrypting part 204 of the certification device 101 calculates the encrypted feature vectors $C' = (c'_1, c'_2, \ldots, c'_T)$ and $\hat{C}' = (\hat{c}'_1, \hat{c}'_2, \ldots, \hat{c}'_T)$.

In step S1105, the communication part 206 of the certification device 101 transmits the encrypted feature vectors $C' = (c'_1, c'_2, \ldots, c'_T)$ and $\hat{C}' = (\hat{c}'_1, \hat{c}'_2, \ldots, \hat{c}'_T)$ to the authentication device 102.

In the transmission, a communication manipulation detection technique such as SSL may be desirably employed so manipulation will not be conducted during communication.

In step S1106, the communication part 206 in the authentication device 102 receives the encrypted feature vectors $C' = (c'_1, c'_2, \ldots, c'_T)$ and $\hat{C}' = (\hat{c}'_1, \hat{c}'_2, \ldots, \hat{c}'_T)$.

In step S1107, the encrypted similarity degree generating part 302 in the authentication device 102 takes the encrypted feature vectors $C = (c_1, c_2, \ldots, c_T)$ and $\hat{C} = (\hat{c}_1, \hat{c}_2, \ldots, \hat{c}_T)$ from the storage part 301.

In general, encrypted biometric information of a large number of users are stored in the storage part 301, and which information to take is determined using separately provided ID information.

In step S1108, the random number generating part 305 of the authentication device 102 takes a value 6T times uniform randomly among integers of 0 to q−1 to obtain $\{s_{1,i}, s_{2,i}, s_{3,i}, \hat{s}_{1,i}, \hat{s}_{2,i}, \hat{s}_{3,i}\}_{i=1,2,\ldots,T}$.

In step S1109, the random number generating part 305 of the authentication device 102 takes a value 4 times uniform randomly among integers of 0 to q−1 to obtain $\{u_2, u_3, \hat{u}_2, \hat{u}_3\}$.

In step S1110, the encrypted similarity degree generating part 302 of the authentication device 102 calculates $d_i = (c_i - c'_i) + s_{1,i} w_1 + s_{2,i} w_2 + s_{3,i} w_3$.

Note that $w_1, w_2$, and $w_3$ have been distributed by the decryption device 103 as a part (W) of the public key.

In step S1111, the encrypted similarity degree generating part 302 of the authentication device 102 calculates $\hat{d}_i = (\hat{c}_i - \hat{c}'_i) + \hat{s}_{1,i} \hat{w}_1 + \hat{s}_{2,i} \hat{w}_2 + \hat{s}_{3,i} \hat{w}_3$.

Note that $\hat{w}_1, \hat{w}_2$, and $\hat{w}_3$ have been distributed by the decryption device 103 as a part (W^) of the public key.

In step S1112, the encrypted similarity degree generating part 302 of the authentication device 102 calculates E in accordance with Numerical Expression 17.

[Numerical Expression 17]
$$E = \sum_{i=1}^{T} (\hat{s}_{1,i}(c_i - c'_i) + s_{1,i}\hat{s}_{1,i}w_1) + u_2 w_2 + u_3 w_3$$

In step S1113, the encrypted similarity degree generating part 302 of the authentication device 102 calculates E^ in accordance with Numerical Expression 18.

[Numerical Expression 18]
$$\hat{E} = \sum_{i=1}^{T} s_{1,i}(\hat{c}_i - \hat{c}'_i) + \hat{u}_2 \hat{w}_2 + \hat{u}_3 \hat{w}_3$$

In step S1114, the communication part 304 of the authentication device 102 transmits $(d_1, \ldots, d_T, \hat{d}_1, \ldots, \hat{d}_T, E, \hat{E})$ to the decryption device 103.

Note that in this embodiment, $(d_1, \ldots, d_T, \hat{d}_1, \ldots, \hat{d}_T, E, \hat{E})$ is an example of the encrypted similarity degree information.

Steps subsequent to this step are the same as those of Embodiment 1, and a description thereof will accordingly be omitted.

According to the above embodiment, the same effect as that of Embodiment 1 can be obtained. Also, the hamming distance or Euclidean squared distance can be used as the similarity degree index.

Embodiment 3.

Embodiments 1 and 2 described above disclose the methods wherein biometric authentication is performed using the Okamoto-Takashima encryption. An authentication method will be described below wherein biometric authentication is performed using a BGN (Boneh-Goh-Nissim) encryption indicated in Non-Patent Literature 2.

A configuration of a biometric authentication system according to this embodiment is also the same as that shown in FIG. 1.

The examples of the internal configurations of the certification device 101, authentication device 102, and decryption device 103 according to this embodiment are also the same as those shown in FIGS. 2 to 4.

First, the BGN encryption algorithm will be described.

A BGN encryption consists of three algorithms: key generation, encryption, and decryption.

The key generation algorithm is as follows.

Assume that p and q are respectively prime numbers.

Groups G and $G_T$ each having an order N are generated where N=pq.

Assume that $e:G \times G \rightarrow G_T$ is a pairing that satisfies bilinearity and non-degenerateness.

Assume that g and u are elements selected from G uniform randomly.

Using $h=u^q$, h is determined.

Assume that the public key is $((G, G_T, N, e), g, h)$ and that the secret key is p.

The encryption algorithm is as follows.

Assume that the plaintext space is $\{0, 1, \ldots, L\}$. Among $\{0, 1, \ldots, N-1\}$, r is selected uniform randomly.

Assume that a ciphertext E(x) corresponding to x is $E(x)=g^x h^r$.

The decryption algorithm is as follows.

Assuming that the ciphertext is E(x), first, using the secret key p, $E(x)^P$ is calculated.

From the definition, $E(x)^P=((g^x h^r)^P=(g^P)^x$.

Concerning this value, a discrete logarithm having a base $g^P$ is calculated, so that the original plaintext x is obtained.

Calculation of a discrete logarithm is regarded difficult for the current computer performance. It is, however, known that if the plaintext space L has a small size, using Pollard's Lambda Method, the discrete logarithm can be calculated with a calculation amount of as small as $\sqrt{L}$.

A method of performing biometric authentication using such a BGN encryption will now be described.

In this embodiment, description will be made on a case where the same feature vector constituting method as that of Embodiment 1 is employed.

More specifically, this embodiment will be exemplified by the following authentication scheme. An array of feature points is prepared as a feature vector to be used for biometric authentication. If the user has a feature point, 1 is stored in the array; if not, 0 is stored in the array. The resultant array is treated as the feature vector. In authentication, the number of positions where bits 1 coincide is employed as the similarity degree index.

The setup will be described with reference to FIG. 13.

Figure 13:
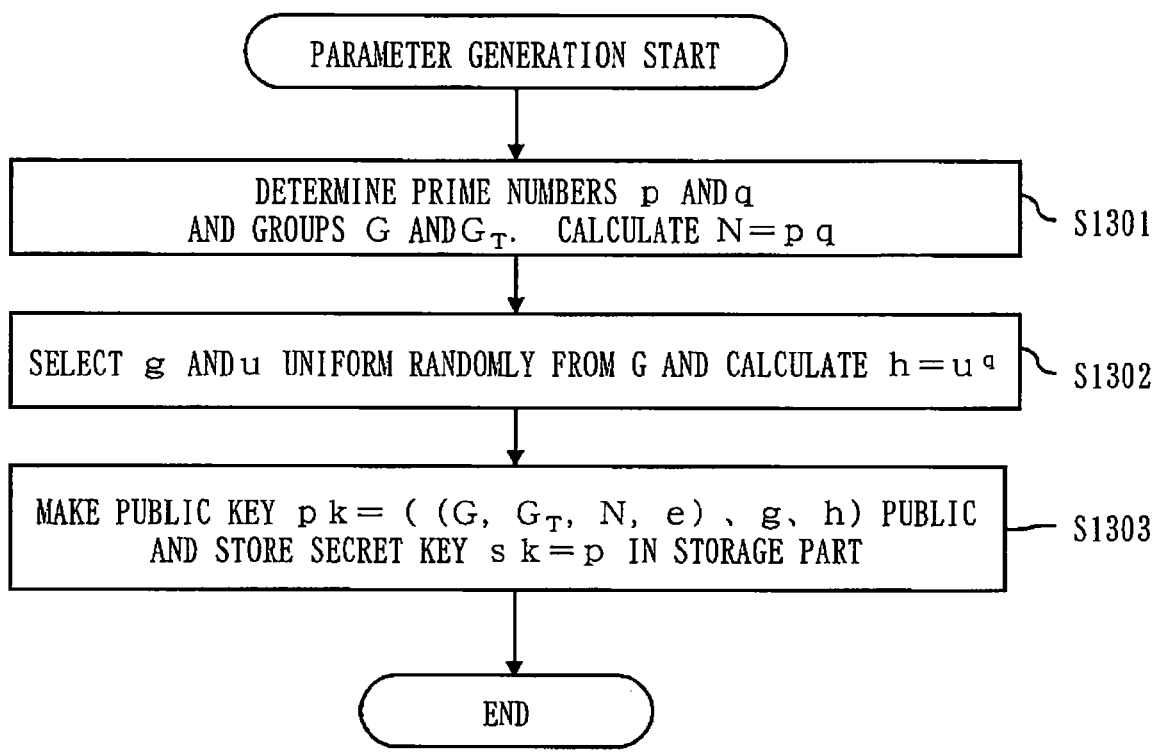
[FIG. 13] is a flowchart showing an example of a setup process according to Embodiment 3.

FIG. 13 is a flowchart showing the procedure of generating the public key and the secret key in the parameter generating part 401.

First, in step S1301, the parameter generating part 401 determines prime numbers p and q and groups G and $G_T$.

Note that the prime number is determined according to the security level. As the product of prime numbers p and q is used as the group order, usually a large-size prime number having, for example, 200 bits or 1024 bits is employed.

In step S1302, the parameter generating part 401 selects g and u uniform randomly from G, and calculates $h=u^q$.

Finally, in step S1303, the parameter generating part 401 makes public the public key $pk=((G, G_T, N, e), g, h)$, and the secret key sk=p is stored in the storage part 403.

A biometric information registration method will be described with reference to FIG. 14.

A case will be described wherein the user registers biometric information in the authentication device 102 via the certification device 101. Registration of the biometric information in the authentication device 102 directly, or via a registration dedicated device, can be realized in accordance with the same procedure.

Figure 14:
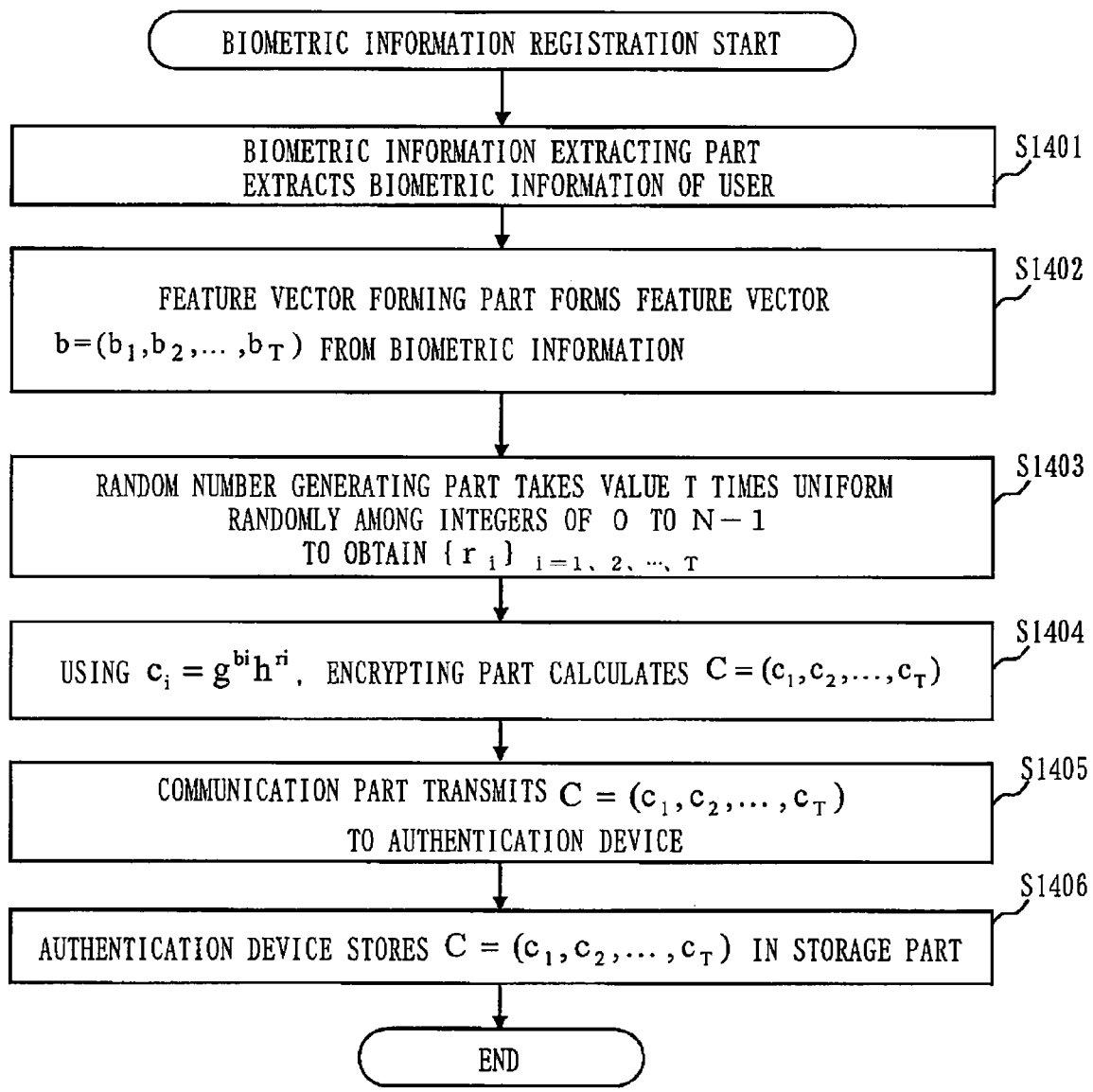
[FIG. 14] is a flowchart showing an example of a biometric information registration process according to Embodiment 3.

FIG. 14 is a flowchart showing the procedure of registering the biometric information in the certification device 101.

First, in step S1401, the biometric information extracting part 201 extracts the biometric information of the user. Extraction can be performed by various methods. For example, the biometric information of the user is extracted by exposing the fingerprint to light and reading its pattern with a sensor.

In step S1402, the feature vector forming part 202 forms a feature vector $b=(b_1, b_2, \ldots, b_T)$ from the biometric information.

In step S1403, the random number generating part 203 takes a value T times uniform randomly among integers of 0 to N−1, so that $\{r_i\}_{i=1, 2, \ldots, T}$ is obtained.

In step S1404, using $c_i=g^{b_i} h^{r_i}$, the encrypting part 204 calculates the encrypted feature vector $C=(c_1, c_2, \ldots, c_T)$.

Note that g and h have been distributed by the decryption device 103 as a part (W) of the public key.

In step S1405, the communication part 206 transmits the encrypted feature vector $C=(c_1, c_2, \ldots, c_T)$ to the authentication device 102.

Finally, in step S1406, the authentication device 102 stores the encrypted feature vector $C=(c_1, c_2, \ldots, c_T)$ in the storage part 301.

The authentication method will be described with reference to FIGS. 15 to 17.

For the sake of simplicity, a case of so-called 1:1 authentication will be described where, in the authentication, the user as the authentication target is separately specified by ID information or the like.

Figure 15:
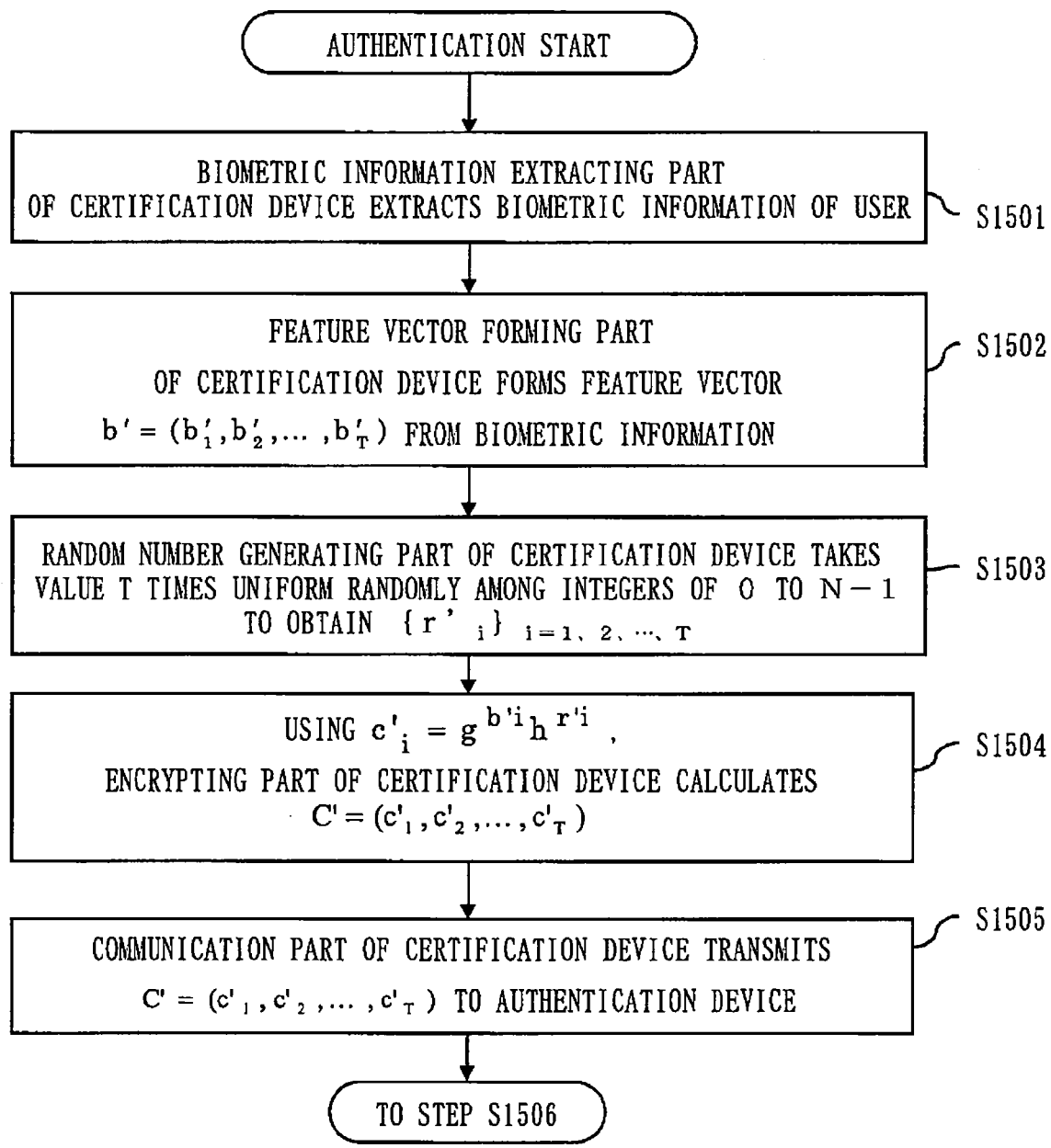
[FIG. 15] is a flowchart showing an example of an authentication process according to Embodiment 3.
Figure 16:
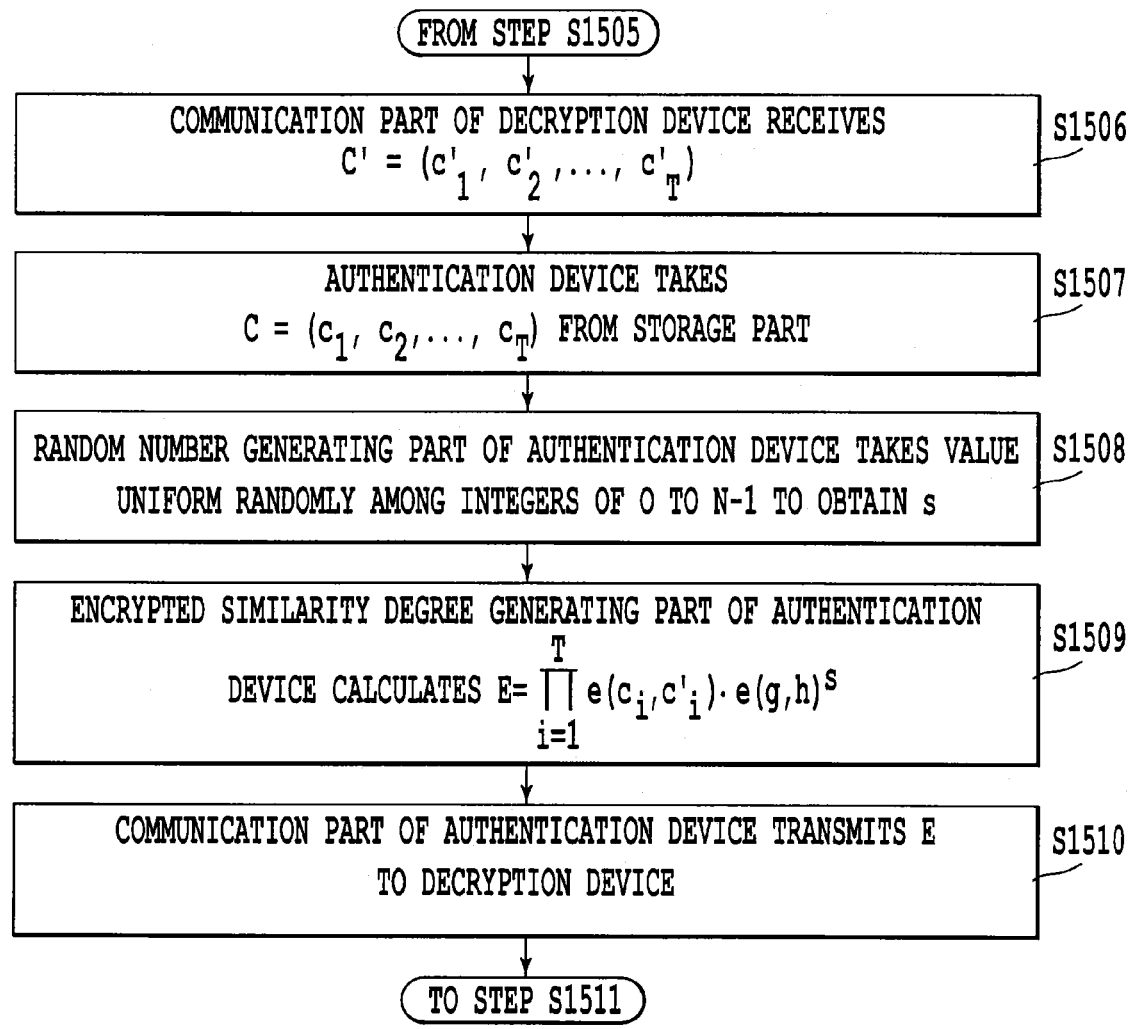
[FIG. 16] is a flowchart showing the example of the authentication process according to Embodiment 3.
Figure 17:
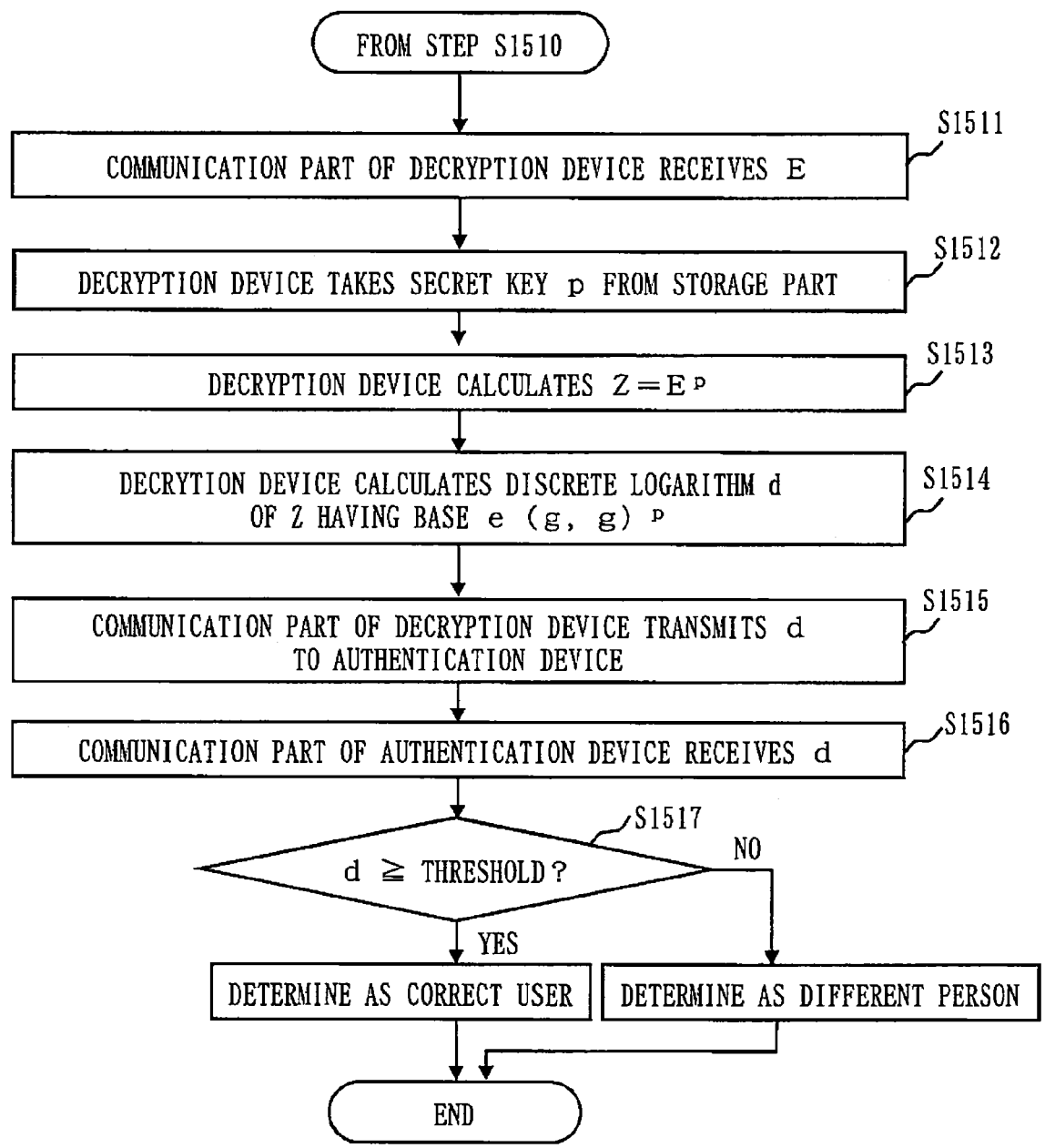
[FIG. 17] is a flowchart showing the example of the authentication process according to Embodiment 3.

FIGS. 15, 16, and 17 are flowcharts showing the procedure of authentication.

First, in step S1501, the biometric information extracting part 201 of the certification device 101 extracts the biometric information of the user.

The extracting method is the same as that employed in the biometric information registration.

In step S1506, the communication part 304 in the authentication device 102 receives the encrypted feature vector $C' = (c'_1, c'_2, \ldots, c'_T)$.

The forming method is the same as that employed for biometric information registration.

In step S1503, the random number generating part 203 of the certification device 101 takes a value T times uniform randomly among integers of 0 to N−1 to obtain $\{r'_i\}_{i=1, 2, \ldots, T}$.

In step S1504, using $c'_i=g^{b'_i} h^{r'_i}$, the encrypting part 204 of the certification device 101 calculates the encrypted feature vector $C'=(c'_1, c'_2, \ldots, c'_T)$.

In step S1505, the communication part 206 of the certification device 101 transmits the encrypted feature vector $C'=(c'_1, c'_2, \ldots, c'_T)$ to the authentication device 102.

In the transmission, a communication manipulation detection technique such as SSL may be desirably employed so manipulation will not be conducted during communication.

In step S1506, the communication part 304 in the authentication device 102 receives the encrypted feature vector $C'=(c'_1, c'_2, \ldots, c'_T)$.

In step S1507, the encrypted similarity degree generating part 302 in the authentication device 102 takes the encrypted feature vector $C=(c_1, c_2, \ldots, c_T)$ from the storage part 301.

In step S1508, the random number generating part 305 of the authentication device 102 takes a value uniform randomly among integers of 0 to N−1 to obtain s.

In step S1509, the encrypted similarity degree generating part 302 of the authentication device 102 calculates E in accordance with Numerical Expression 19.

[Numerical Expression 19]
$$E = \sum_{i=1}^{T} e(c_i, c'_i) \cdot e(g, h)^s$$

In step S1510, the communication part 304 of the authentication device 102 transmits E to the decryption device 103.

In the transmission, a communication manipulation detection technique such as SSL may be desirably employed so manipulation will not be conducted during communication.

In this embodiment, E serves as the encrypted similarity degree information.

In step S1511, the communication part 404 of the decryption device 103 receives E.

In step S1512, the decrypting part 402 of the decryption device 103 takes the secret key p from the storage part 403.

In step S1513, the decrypting part 402 of the decryption device 103 calculates $Z=E^P$.

In step S1514, the decrypting part 402 of the decryption device 103 calculates a discrete logarithm d of Z having a base $e(g, g)^P$.

This discrete logarithm d corresponds to the similarity degree in this embodiment as well.

In step S1515, the communication part 404 of the decryption device 103 transmits d to the authentication device 102. In the transmission, a communication manipulation detection technique such as SSL may be desirably employed so manipulation will not be conducted during communication.

In step S1516, the communication part 304 of the authentication device 102 receives the similarity degree d.

In step S1517, the checking part 303 checks whether or not the similarity degree is equal to or larger than the threshold.

The threshold is a value determined by the system in advance by taking into account various factors such as the type of biometric information to be utilized or the security requirements.

If the similarity degree d is equal to or larger than the threshold, it is determined that the encrypted biometric information sent from the certification device 101 belongs to the correct user specified by the ID.

If the similarity degree d is less than the threshold, it is determined that the encrypted biometric information sent from the certification device 101 does not belong to the correct user specified by the ID but belongs to a different person.

Through the above steps, the authentication device 102 can perform biometric authentication with the certification device 101.

According to the above embodiment, the same effect as that of Embodiment 1 can be obtained. Also, the number of public keys and the number of secret keys can be smaller than in Embodiment 1.

Also, as compared to Embodiment 1, the number of ciphertexts to be sent to the decryption device 103 can be decreased.

Embodiment 4.

Embodiment 3 described above discloses the authentication method wherein the inner product of feature vectors is calculated and biometric authentication is performed using the obtained value. An authentication method will now be described below wherein biometric authentication is performed using the hamming distance or Euclidean squared distance between the feature vectors.

A configuration example of a biometric authentication system according to this embodiment is the same as that shown in FIG. 1. The examples of the internal configurations of the certification device 101, authentication device 102, and decryption device 103 according to this embodiment are the same as those shown in FIGS. 2 to 4.

A parameter generating method and a biometric information registration method according to this embodiment are the same as those of Embodiment 3, and a description thereof will accordingly be omitted.

Figure 18:
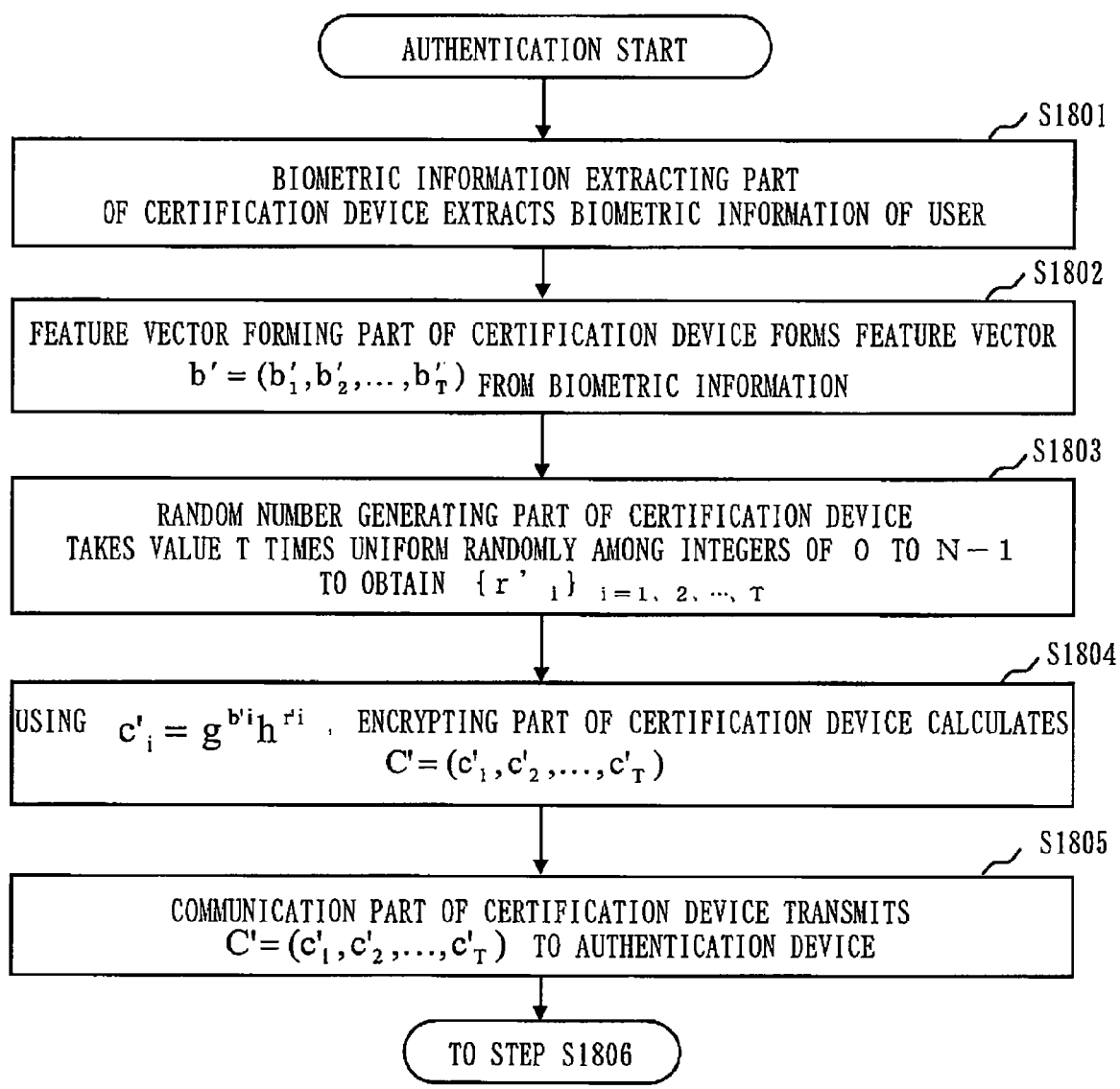
[FIG. 18] is a flowchart showing an example of an authentication process according to Embodiment 4.
Figure 19:
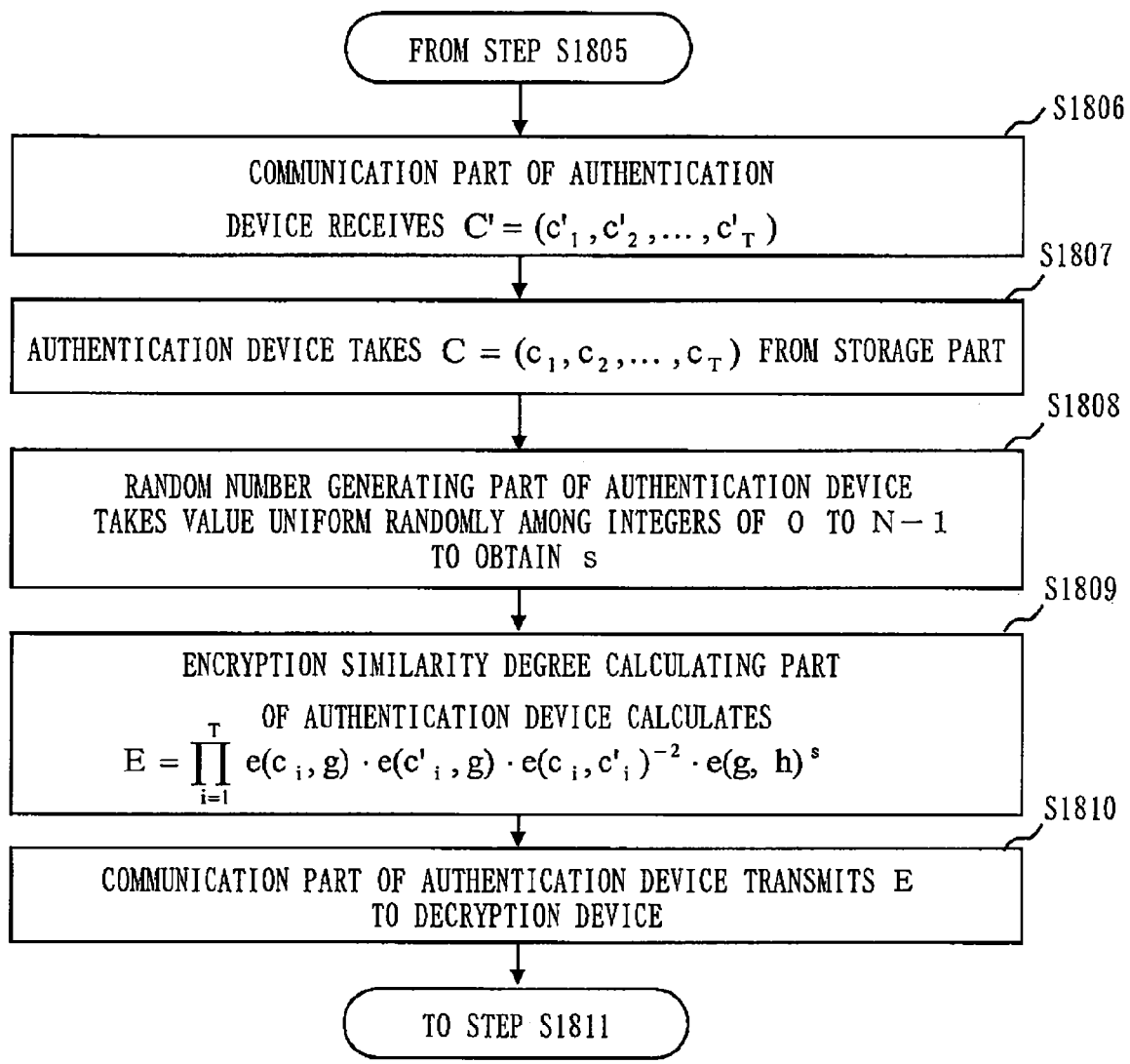
[FIG. 19] is a flowchart showing the example of the authentication process according to Embodiment 4.
Figure 20:
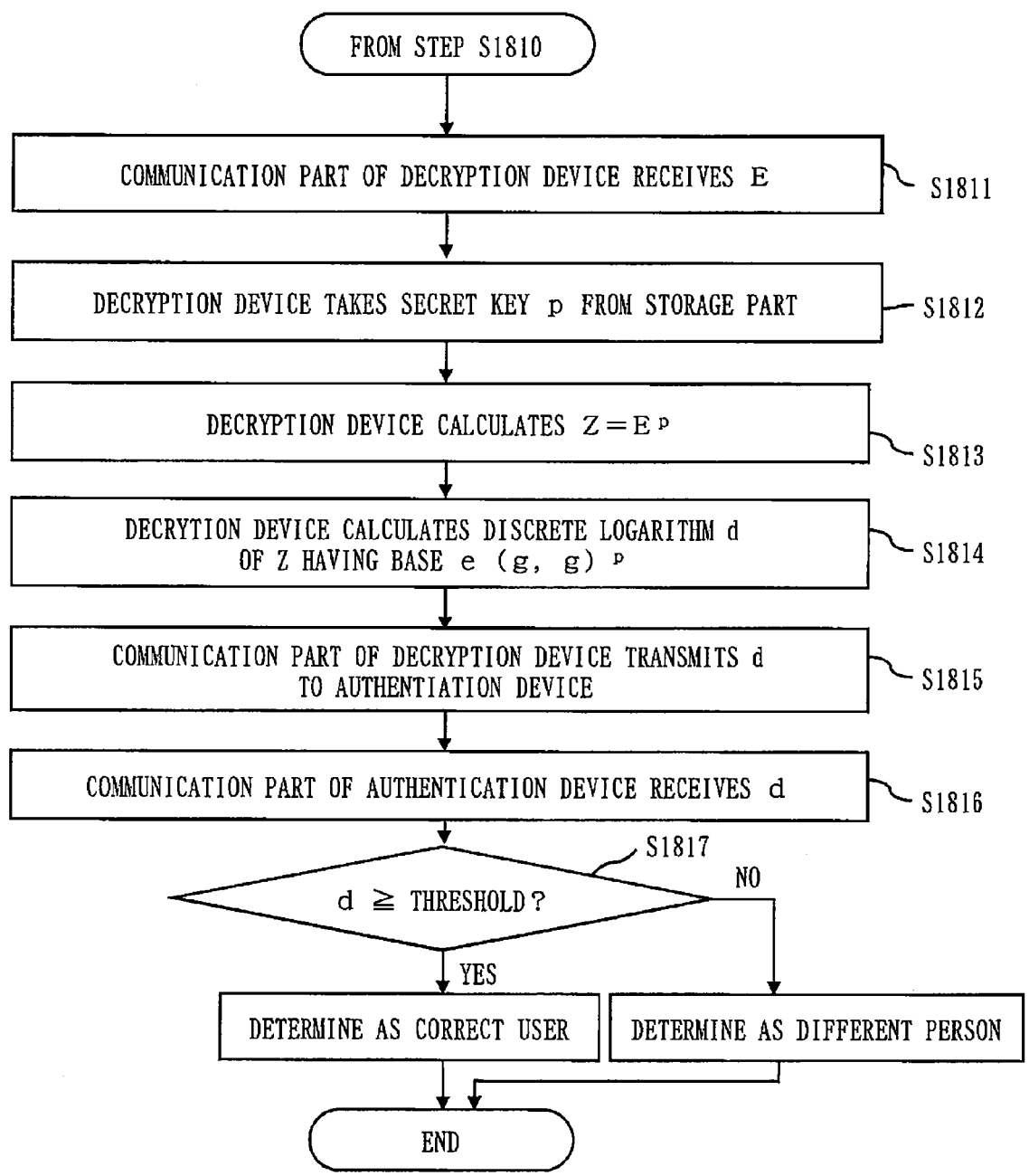
[FIG. 20] is a flowchart showing the example of the authentication process according to Embodiment 4.

The authentication method will be described with reference to FIGS. 18, 19, and 20.

For the sake of simplicity, a case of so-called 1:1 authentication will be described where, in the authentication, the user as the authentication target is separately specified by ID information or the like.

Steps S1801 through S1808 are the same as their counterparts in Embodiment 3, and a description thereof will accordingly be omitted.

In step S1809, the encrypted similarity degree generating part 302 of the authentication device 102 calculates E in accordance with Numerical Expression 20.

[Numerical Expression 20]
$$E = \sum_{i=1}^{T} e(c_i, g) \cdot e(c'_i, g) \cdot e(c_i, c'_i)^{-2} \cdot e(g, h)^s$$

Steps subsequent to this step are the same as those of Embodiment 3, and a description thereof will accordingly be omitted.

According to the above embodiment, in addition to the same effect as that of Embodiment 2, the same effect as that of Embodiment 3 can also be obtained.

So far the biometric authentication methods using a doubly homomorphic encryption are disclosed in Embodiments 1 to 4. It is obvious that application of the biometric authentication is not limited to biometric authentication but includes a pattern matching field as well.

More specifically, according to the authentication methods indicated in Embodiments 1 to 4, the similarity degree of data can be checked with the data being kept encrypted.

As a result, image search, video search, voice search, and the like become possible with the data being kept encrypted.

The above Embodiments 1 to 4 indicate that, using biometric authentication and the doubly homomorphic encryption, biometric authentication is realized with the biometric information being kept encrypted.

More specifically, conventionally, since an ordinary homomorphic encryption is employed, the authentication process cannot be performed with every information being kept encrypted. This leads to a problem that in the authentication process, the communication amount between the user and the authentication device may undesirably increase.

By employing the doubly homomorphic encryption, the authentication process can be performed with every information being kept encrypted. This leads to an effect that the communication amount between the user and the authentication device can be decreased.

The combination of biometric authentication and doubly homomorphic encryption realizes biometric authentication that is secure and has high communication amount efficiency.

Finally, a hardware configuration example of each of the certification device 101, authentication device 102, and decryption device 103 shown in Embodiments 1 to 4 will be described.

Figure 25:
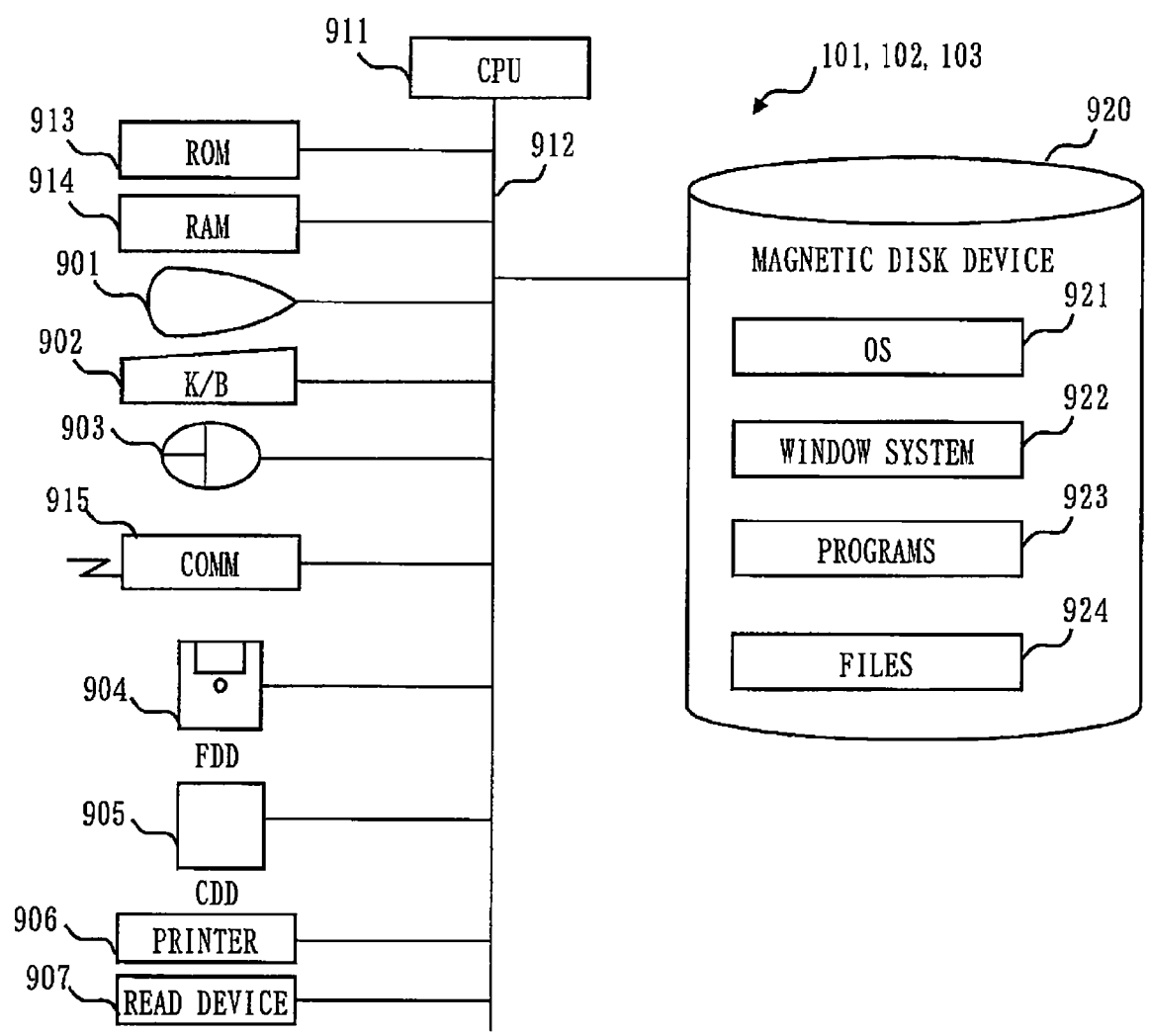
[FIG. 25] is a diagram showing a hardware configuration of the certification device, the authentication device, and the decryption device according to Embodiment 1.

FIG. 25 shows an example of the hardware resource of each of the certification device 101, authentication device 102, and decryption device 103 shown in Embodiments 1 to 4.

Note that the configuration of FIG. 25 is merely an example of the hardware configuration of the certification device 101, authentication device 102, and decryption device 103. The hardware configuration of the certification device 101, authentication device 102, and decryption device 103 is not limited to that shown in FIG. 25, but another configuration may be possible.

Referring to FIG. 25, each of the certification device 101, authentication device 102, and decryption device 103 includes a CPU 911 (also referred to as a Central Processing Unit, central processing device, processing device, computation device, microprocessor, microcomputer, or processor) that executes programs.

The CPU 911 is connected to, for example, a ROM (Read Only Memory) 913, a RAM (Random Access Memory) 914, a communication board 915, a display device 901, a keyboard 902, a mouse 903, and a magnetic disk device 920 via a bus 912, and controls these hardware devices. Furthermore, the CPU 911 may be connected to an FDD 904 (Flexible Disk Drive), a compact disk device 905 (CDD), or a printer device 906. The certification device 101 is connected to a read device 907 which reads biometric information. In place of the magnetic disk device 920, a storage device such as an optical disk device or memory card (registered trademark) read/write device may be employed.

The RAM 914 is an example of a volatile memory. The storage media, namely the ROM 913, FDD 904, CDD 905, and magnetic disk device 920, are examples of a nonvolatile memory. These devices are examples of the storage device.

The "storage part" described in Embodiments 1 to 4 is realized by the RAM 914, magnetic disk device 920, or the like.

The communication board 915, keyboard 902, mouse 903, read device 907, FDD 904, and the like are examples of an input device.

The communication board 915, display device 901, printer device 906, and the like are examples of an output device.

The communication board 915 may be connected to, for example, a LAN (Local Area Network), the Internet, a WAN (Wide Area Network), or a SAN (Storage Area Network) as well, in addition to other devices.

The magnetic disk device 920 stores an operating system 921 (OS), a window system 922, programs 923, and files 924.

The CPU 911 executes each program of the programs 923 by utilizing the operating system 921 and the window system 922.

The RAM 914 temporarily stores at least some programs of the operating system 921 and application programs that are executed by the CPU 911.

The RAM 914 also stores various types of data necessary for the process performed by the CPU 911.

The ROM 913 stores the BIOS (Basic Input Output System) program. The magnetic disk device 920 stores the boot program.

When the certification device 101, the authentication device 102, or the decryption device 103 is booted, the BIOS program of the ROM 913 and the boot program of the magnetic disk device 920 are executed, and the BIOS program and boot program boot the operating system 921.

The programs 923 include a program that executes the function described as a "part" (excluding the "storage part"; this applies to the following explanation as well) described in Embodiments 1 to 4. The program is read and executed by the CPU 911.

The files 924 store information, data, signal values, variable values, and parameters indicating the results of the processes described as "determining", "checking", "calculating", "comparing", "deriving", "extracting", "forming", "updating", "setting", "registering", "selecting", and the like which are described in Embodiments 1 to 4, as the items of "files" and "databases".

The "files" and "databases" are stored in a recording medium such as a disk or memory. The information, data, signal values, variable values, and parameters stored in the storage medium such as the disk or memory are read out to the main memory or cache memory by the CPU 911 through a read/write circuit, and are used for the operations of the CPU such as extraction, search, look-up, comparison, computation, calculation, process, edit, output, print, and display.

During the operations of the CPU including extraction, search, look-up, comparison, computation, calculation, process, edit, output, print, and display, the information, data, signal values, variable values, and parameters are temporarily stored in the main memory, register, cache memory, buffer memory, or the like.

The arrows of the flowcharts described in Embodiments 1 to 4 mainly indicate input/output of data and signals. The data and signal values are stored in a recording medium such as the memory of the RAM 914, the flexible disk of the FDD 904, the compact disk of the CDD 905, or the magnetic disk of the magnetic disk device 920; or an optical disk, mini disk, or DVD. The data and signals are transmitted online via the bus 912, signal lines, cables, and other transmission media.

The "part" in Embodiments 1 to 4 may be a "circuit", "device", or "equipment"; or a "step", "procedure", or "process". Namely, the "part" may be realized as the firmware stored in the ROM 913. Alternatively, the "part" may be practiced by only software; by only hardware such as an element, a device, a substrate, or a wiring line; by a combination of software and hardware; or furthermore by a combination of software, hardware, and firmware. The firmware and software are stored, as programs, in a recording medium such as a magnetic disk, flexible disk, optical disk, compact disk, mini disk, or DVD. The program is read by the CPU 911 and executed by the CPU 911. In other words, a program causes the computer to function as a "part" in Embodiments 1 to 4. Alternatively, the program causes the computer to execute the procedure and method of the "part" in Embodiments 1 to 4.

In this manner, each of the certification device 101, authentication device 102, and decryption device 103 indicated in Embodiments 1 to 4 is a computer comprising a CPU being a processing device; a memory, magnetic disk, or the like being a storage device; a keyboard, mouse, communication board, or the like being an input device; and a display device, communication board, or the like being an output device, and realizes the functions indicated as the "parts" by using these processing device, storage device, input device, and output device, as described above.

REFERENCE SIGNS LIST

101: certification device; 102: authentication device; 103: decryption device; 201: biometric information extracting part; 202: feature vector forming part; 203: random number generating part; 204: encrypting part: 205: storage part; 206: communication part; 301: storage part; 302: encrypted similarity degree generating part; 303: checking part; 304: communication part; 305: random number generating part; 401: parameter generating part; 402: decrypting part; 403: storage part; 404: communication part 404

The invention claimed is:

1. A data processing device comprising:
a public key storage circuit which stores a public key generated in a decryption device based on a doubly homomorphic encryption algorithm and distributed by the decryption device;
an encrypted data storage circuit which stores, as encrypted first data, first data that has been encrypted by an encryption device which holds the public key distributed by the decryption device, by using the public key held in the encryption device;
an encrypted data input circuit which, after the encrypted first data is stored in the encrypted data storage circuit, inputs, as encrypted second data, second data that has been encrypted by the encryption device by using the public key held in the encryption device;
a random number generating circuit which generates a random number by using at least a part of the public key; and
an encrypted similarity degree generating circuit which performs computation on the encrypted first data and the encrypted second data by using the public key stored in the public key storage circuit and the random number generated by the random number generating circuit, and generates, as encrypted similarity degree information, encrypted information from which a similarity degree between the first data and the second data can be derived by a decryption process using a secret key generated to correspond to the public key, with the encrypted first data and the encrypted second data being kept encrypted.

2. The data processing device according to claim 1, wherein
the public key storage circuit stores the public key generated by the decryption device to correspond to the secret key based on the doubly homomorphic encryption algorithm, and
the data processing device further comprising:
an encrypted similarity degree output circuit which outputs the encrypted similarity degree information generated by the encrypted similarity degree generating circuit to the decryption device;
a similarity degree input circuit which inputs the similarity degree between the first data and the second data, the similarity degree being derived by performing, in the decryption device, a decryption process on the encrypted similarity degree information by using the secret key; and
a checking circuit which analyzes the similarity degree inputted by the similarity degree input circuit and checks whether or not a source of the second data is correct.

3. The data processing device according to claim 1, wherein
the encrypted data storage circuit stores the encrypted first data constituted by T (T is an integer not less than 2) pieces of encrypted partial data which are obtained by encrypting, in the encryption device, T pieces of partial data that constitute the first data,
the encrypted data input circuit inputs the encrypted second data constituted by T (T is an integer not less than 2) pieces of encrypted partial data which are obtained by encrypting, in the encryption device, T pieces of partial data that constitute the second data, and
the encrypted similarity degree generating circuit performs computation for each partial data of the encrypted first data and the encrypted second data by using the public key stored in the public key storage circuit and the random number generated by the random number generating circuit, and generates information from which the number of partial data, among the T pieces of partial data of the first data and the T pieces of partial data of the second data, that have coincident values can be derived, as the similarity degree between the first data and second data.

4. The data processing device according to claim 1, wherein
the encrypted data storage circuit stores the encrypted first data constituted by T (T is an integer not less than 2) pieces of encrypted partial data which are obtained by encrypting, in the encryption device, T pieces of partial data that constitute the first data,
the encrypted data input circuit inputs the encrypted second data constituted by T (T is an integer not less than 2) pieces of encrypted partial data which are obtained by encrypting, in the encryption device, T pieces of partial data that constitute the second data, and
the encrypted similarity degree generating circuit performs computation for each partial data of the encrypted first data and the encrypted second data by using the public key stored in the public key storage circuit and the random number generated by the random number generating circuit, and generates information from which a hamming distance between the T pieces of partial data of the first data and the T pieces of partial data of the second data can be derived, as the similarity degree between the first data and second data.

5. The data processing device according to claim 1, wherein
the encrypted data storage circuit stores the encrypted first data constituted by T (T is an integer not less than 2) pieces of encrypted partial data which are obtained by encrypting, in the encryption device, T pieces of partial data that constitute the first data,
the encrypted data input circuit inputs the encrypted second data constituted by T (T is an integer not less than 2) pieces of encrypted partial data which are obtained by encrypting, in the encryption device, T pieces of partial data that constitute the second data, and
the encrypted similarity degree generating circuit performs computation for each partial data of the encrypted first data and encrypted second data by using the public key stored in the public key storage circuit and the random number generated by the random number generating circuit, and generates information from which a Euclidean squared distance between the T pieces of partial data of the first data and the T pieces of partial data of the second data can be derived, as the similarity degree between the first data and second data.

6. The data processing device according to claim 1, wherein
the public key storage circuit stores the public key generated based on an Okamoto-Takashima encryption algorithm, as the public key generated based on the doubly homomorphic encryption algorithm, the encrypted data storage circuit stores the encrypted first data obtained by encryption using the public key generated based on the Okamoto-Takashima encryption algorithm, and the encrypted data input circuit inputs the encrypted second data obtained by encryption using the public key generated based on the Okamoto-Takashima encryption algorithm.

7. The data processing device according to claim 6, wherein the public key storage circuit stores random bases $w_1, w_2, w_3, \hat{w}_1, \hat{w}_2,$ and $\hat{w}_3$ generated to correspond to the secret key which is a regular matrix, and a predetermined value q, as the public key, the encrypted data storage circuit stores the encrypted first data constituted by T (T is an integer not less than 2) pieces of encrypted partial data ci (subscript i is 1 to T) which are obtained by encrypting T pieces of partial data bi (subscript i is 1 to T) that constitute the first data, using the random bases $w_1$, $w_2$, and $w_3$, in the encryption device that holds the random bases $w_1$, $w_2$, and $w_3$, the encrypted data input circuit inputs the encrypted second data constituted by T (T is an integer not less than 2) pieces of encrypted partial data $\hat{c}_i$ (subscript i is 1 to T) which are obtained by encrypting T pieces of partial data $b'_i$ (subscript i is 1 to T) that constitute the second data, using the random bases $\hat{w}_i$, $\hat{w}_2$, and $\hat{w}_3$, in the encryption device which holds the random bases $\hat{w}_i$, $\hat{w}_2$, and $\hat{w}_3$, the random number generating circuit generates a plurality of random number values $s_{1,i}, s_{2,i}, s_{3,i}, \hat{s}_{1,i}, \hat{s}_{2,i},$ and $\hat{s}_{3,i}$ (subscript i is 1 to T) based on the value q and generates a plurality of random number values $u_2, u_3, \hat{u}_2,$ and $\hat{u}_3$ based on the value q, and the encrypted similarity degree generating circuit calculates $d_i = c_i + (s_{1,i} \times w_1) + (s_{2,i} \times w_2) + (s_{3,i} \times w_3)$ for 1 to T of subscript i, calculates $\hat{d}_i = \hat{c}_i + (\hat{s}_{1,i} \times \hat{w}_1) + (\hat{s}_{2,i} \times \hat{w}_2) + (\hat{s}_{3,i} \times \hat{w}_3)$ for 1 to T of subscript i, calculates $E = \{$a sum total of $(\hat{s}_{1,i} \times c_i + s_{1,i} \times \hat{s}_{1,i} \times w_1)$ for 1 to T of subscript i$\} + (u_2 \times w_2) + (u_3 \times w_3)$, calculates $\hat{E} = \{$a sum total of $(s_{1,i} \times \hat{c}_i)$ for 1 to T of subscript i$\} + (\hat{u}_2 \times \hat{w}_2) + (\hat{u}_3 \times \hat{w}_3)$, and generates the encrypted similarity degree information including the calculated values $d_i$, $\hat{d}_i$, E, and $\hat{E}$.

8. The data processing device according to claim 7, wherein the encrypted data storage circuit stores the encrypted first data constituted by T pieces of partial data ci which are obtained by encrypting T pieces of partial data bi in accordance with $c_i = (b_i \times w_1) + (r_{2,i} \times w_2) + (r_{3,i} \times w_3)$, by using random number values $r_{2,i}$ and $r_{3,i}$ (subscript i is 1 to T) generated by the encryption device, and the random bases $w_1$, $w_2$, and $w_3$, and the encrypted data input circuit inputs the encrypted second data constituted by T pieces of partial data $\hat{c}_i$ which are obtained by encrypting T pieces of partial data $b'_i$ in accordance with $\hat{c}_i = (b'_i \times \hat{w}_1) + (r'_{2,i} \times \hat{w}_2) + (r'_{3,i} \times \hat{w}_3)$, by using random number values $r'_{2,i}$ and $r'_{3,i}$ (subscript i is 1 to T) generated by the encryption device, and the random bases $\hat{w}_i$, $\hat{w}_2$, and $\hat{w}_3$.

9. The data processing device according to claim 7, further comprising:

an encrypted similarity degree output circuit which outputs the encrypted similarity degree information generated by the encrypted similarity degree generating circuit to the decryption device;

a similarity degree input circuit which inputs the similarity degree between the first data and the second data, the similarity degree being derived by performing, in the decryption device, the decryption process on the encrypted similarity degree information by using an inverse matrix of the secret key and a distortion map in bilinear pairing vector spaces; and a checking circuit which analyzes the similarity degree inputted by the similarity degree input part circuit, and checks whether or not a source of the second data is correct.

10. The data processing device according to claim 6, wherein the public key storage circuit stores random bases $w_1$, $w_2$, $w_3$, $\hat{w}_1$, $\hat{w}_2$ and $\hat{w}_3$ generated to correspond to the secret key which is a regular matrix, and a predetermined value q, as the public key, the encrypted data storage circuit stores the encrypted first data constituted by T (T is an integer not less than 2) pieces of encrypted partial data $c_i$ (subscript i is 1 to T) and T pieces of encrypted partial data $\hat{c}_i$ (subscript i is 1 to T), the T pieces of encrypted partial data $c_i$ being obtained by encrypting T pieces of partial data $b_i$ (subscript i is 1 to T) that constitute the first data, using the random bases $w_1$, $w_2$, and $w_3$, in the encryption device which holds the random bases $w_1$, $w_2$, and $w_3$, and the T pieces of encrypted partial data $\hat{c}_i$ (subscript i is 1 to T) being obtained by encrypting T pieces of partial data $b_i$ that constitute the first data, using the random bases $\hat{w}_1$, $\hat{w}_2$, and $\hat{w}_3$, in the encryption device which holds the random bases $\hat{w}_1$, $\hat{w}_2$, and $\hat{w}_3$, the encrypted data input circuit inputs the encrypted second data constituted by T (T is an integer not less than 2) pieces of encrypted partial data $c'_i$ (subscript i is 1 to T) and T pieces of encrypted partial data $\hat{c}'_i$ (subscript i is 1 to T), the T pieces of encrypted partial data $c'_i$ being obtained by encrypting T pieces of partial data $b'_i$ (subscript i is 1 to T) that constitute the second data, using the random bases $w_1$, $w_2$, and $w_3$, in the encryption device, and the T pieces of encrypted partial data $\hat{c}'_i$ being obtained by encrypting T pieces of partial data $b'_i$ that constitute the second data, using the random bases $\hat{w}_1$, $\hat{w}_2$, $\hat{w}_3$, in the encryption device, the random number generating circuit generates a plurality of random number values $s_{1,i}, s_{2,i}, s_{3,i}, \hat{s}_{1,i}, \hat{s}_{2,i},$ and $\hat{s}_{3,i}$ (subscript i is 1 to T) based on the value q and generates a plurality of random number values $u_2, u_3, \hat{u}_2,$ and $\hat{u}_3$ based on the value q, and the encrypted similarity degree generating circuit calculates $d_i = (c_i - c'_i) + (s_{1,i} \times w_1) + (s_{2,i} \times w_2) + (s_{3,i} \times w_3)$ for 1 to T of subscript i, calculates $\hat{d}_i = (\hat{c}_i - \hat{c}'_i) + (\hat{s}_{1,i} \times \hat{w}_1) + (\hat{s}_{2,i} \times \hat{w}_2) + (\hat{s}_{3,i} \times \hat{w}_3)$ for 1 to T of subscript i, calculates $E = \{$a sum total of $(\hat{s}_{1,i} \times (c_1 - c'_i) + s_{1,i} \times \hat{s}_{1,i} \times w_1)$ for 1 to T of subscript i$\} + (u_2 \times w_2) + (u_3 \times w_3)$, calculates $\hat{E} = [$a sum total of $\{(s_{1,i} \times (\hat{c}_i - \hat{c}'_i)\}$ for 1 to T of subscript i$] + (\hat{u}_2 \times \hat{w}_2) + (\hat{u}_3 \times \hat{w}_3)$, and generates the encrypted similarity degree information including the calculated values $d_i$, $\hat{d}_i$, E, and $\hat{E}$.

11. The data processing device according to claim 10, wherein the encrypted data storage circuit stores the encrypted first data constituted by T pieces of partial data ci and T pieces of partial data $\hat{c}_i$, the T pieces of partial data $c_i$ being obtained by encrypting T pieces of partial data bi in accordance with $c_i = (b_i \times w_1) + (r_{2,i} \times w_2) + (r_{3,i} \times w_3)$ using random number values $r_{2,i}$ and $r_{3,i}$ (subscript i is 1 to T) generated by the encryption device, and the random bases $w_1$, $w_2$, and $w_3$, and the T pieces of partial data $\hat{c}_i$ being obtained by encrypting T pieces of partial data bi in accordance with $\hat{c}_i = (b_i \times \hat{w}_1) + (\hat{r}_{2,i} \times \hat{w}_2) + (\hat{r}_{3,i} \times \hat{w}_3)$ using random number values $\hat{r}_{2,i}$ and $\hat{r}_{3,i}$ (subscript i is 1 to T) generated by the encryption device, and the random bases $\hat{w}_1$, $\hat{w}_2$, and $\hat{w}_3$, and, the encrypted data input circuit inputs the encrypted second data constituted by T pieces of partial data $c'_i$ and T pieces of partial data $\hat{c'}_i$, the T pieces of partial data $c'_i$ being obtained by encrypting T pieces of partial data $b'_i$ in accordance with $c'_i = (b'_i \times w_1) + (r'_{2,i} \times w_2) + (r'_{3,i} \times w_3)$ using random number values $r'_{2,i}$ and $r'_{3,i}$ (subscript i is 1 to T) generated by the encryption device, and the random bases $w_1$, $w_2$, and $w_3$, and the T pieces of partial data $\hat{c'}_i$ being obtained by encrypting T pieces of partial data $b'_i$ in accordance with $\hat{c'}_i = (b'_i \times \hat{w}_1) + (\hat{r'}_{2,i} \times \hat{w}_2) + (\hat{r'}_{3,i} \times \hat{w}_3)$ using random number values $\hat{r'}_{2,i}$ and $\hat{r'}_{3,i}$ (subscript i is 1 to T) generated by the encryption device, and the random bases $\hat{w}_1$, $\hat{w}_2$, and $\hat{w}_3$.

12. The data processing device according to claim 10, further comprising:

an encrypted similarity degree output circuit which outputs the encrypted similarity degree information generated by the encrypted similarity degree generating circuit to the decryption device;

a similarity degree input circuit which inputs the similarity degree between the first data and the second data, the similarity degree being derived by performing, in the decryption device, the decryption process on the encrypted similarity degree information by using an inverse matrix of the secret key and a distortion map in bilinear pairing vector spaces; and a checking circuit which analyzes the similarity degree inputted by the similarity degree input circuit, and checks whether or not a source of the second data is correct.

13. The data processing device according to claim 1, wherein the public key storage circuit stores the public key generated based on a BGN (Boneh-Goh-Nissim) encryption algorithm, as the public key generated based on the doubly homomorphic encryption algorithm, the encrypted data storage circuit stores encrypted first data obtained by encryption using the public key generated based on the BGN encryption algorithm, and the encrypted data input circuit inputs encrypted second data obtained by encryption using the public key generated based on the BGN encryption algorithm.

14. The data processing device according to claim 13, wherein the public key storage circuit stores a value g and a value u which are selected randomly from a group G having an order $N = p \times q$ (p and q are primary numbers), a value $h = u^q$, and a predetermined value N, as the public key, the encrypted data storage circuit stores the encrypted first data constituted by T (T is an integer not less than 2) pieces of encrypted partial data $c_i$ (subscript i is 1 to T) which are obtained by encrypting T pieces of partial data $b_i$ (subscript i is 1 to T) that constitute the first data, using the value g and the value h, in the encryption device which holds the value g and the value h, the encrypted data input circuit inputs the encrypted second data constituted by T (T is an integer not less than 2) pieces of encrypted partial data $c'_i$ (subscript i is 1 to T) which are obtained by encrypting T pieces of partial data $b'_i$ (subscript i is 1 to T) that constitute the second data, using the value g and the value h, in the encryption device, the random number generating circuit generates a random number value s based on the value N, and the encrypted similarity degree generating circuit calculates an infinite product $E = e(c_i, c'_i) \times e(g, h)^s$ for 1 to T of subscript i ($e: G \times \hat{G} \to G_T$ is a pairing that satisfies bilinearity and non-degenerateness), and generates the encrypted similarity degree information that includes the calculated value E.

15. The data processing device according to claim 13, wherein the public key storage circuit stores a value g and a value u which are selected randomly from a group G having an order $N = p \times q$ (p and q are primary numbers), a value $h = u^q$, and a predetermined value N, as the public key, the encrypted data storage circuit stores the encrypted first data constituted by T pieces of encrypted partial data $c_i$ (subscript i is 1 to T) which are obtained by encrypting T (T is an integer not less than 2) pieces of partial data $b_i$ (subscript i is 1 to T) that constitute the first data, using the value g and the value h, in the encryption device which holds the value g and the value h, the encrypted data input circuit inputs the encrypted second data constituted by T (T is an integer not less than 2) pieces of encrypted partial data $c'_i$ (subscript i is 1 to T) which are obtained by encrypting T pieces of partial data $b'_i$ (subscript i is 1 to T) that constitute the second data, using the value g and the value h, in the encryption device, the random number generating circuit generates a random number value s based on the value N, and the encrypted similarity degree generating circuit calculates an infinite product $E = e(c_i, g) \times e(c'_i, g) \times e(c_i, c'_i)^{-2} \times e(g, h)^s$ for 1 to T of subscript i ($e: G \times \hat{G} \to G_T$ is a pairing that satisfies bilinearity and non-degenerateness), and generates the encrypted similarity degree information that includes the calculated value E.

* * * * *